United States Patent
Lu et al.

(10) Patent No.: US 6,828,062 B2
(45) Date of Patent: Dec. 7, 2004

(54) LONG-LIVED CONJUGATED POLYMER ELECTROCHEMICAL DEVICES INCORPORATING IONIC LIQUIDS

(75) Inventors: Wen Lu, Santa Fe, NM (US); Benjamin R. Mattes, Santa Fe, NM (US); Andrei G. Fadeev, Santa Fe, NM (US)

(73) Assignee: Santa Fe Science and Technology, Inc., Santa Fe, NM (US)

( * ) Notice: Subject to any disclaimer, the term of this patent is extended or adjusted under 35 U.S.C. 154(b) by 181 days.

(21) Appl. No.: 10/027,251

(22) Filed: Dec. 21, 2001

(65) Prior Publication Data

US 2002/0177039 A1 Nov. 28, 2002

Related U.S. Application Data

(60) Provisional application No. 60/258,381, filed on Dec. 23, 2000.

(51) Int. Cl.[7] .............................................. H01M 4/60
(52) U.S. Cl. ...................................................... 429/213
(58) Field of Search .................... 429/13, 213; 204/242; 205/688, 768, 769

(56) References Cited

U.S. PATENT DOCUMENTS

| 4,740,436 | A | * | 4/1988 | Kobayashi et al. | .......... 429/213 |
| 5,827,602 | A | * | 10/1998 | Koch et al. | .................. 429/328 |
| 5,965,054 | A | * | 10/1999 | McEwen et al. | ........... 252/62.2 |

* cited by examiner

Primary Examiner—Patrick Ryan
Assistant Examiner—Thomas H. Parsons
(74) Attorney, Agent, or Firm—Samuel M. Freund; Cochran Freund & Young LLC

(57) ABSTRACT

The present invention relates to the electrochemistry of conjugated polymers in ionic liquids and the development and fabrication of long-lived, highly stable conjugated polymer electrochemical devices by using ionic liquids as electrolytes. More specially, the invention relates to the use of ionic liquids as electrolytes for the fabrication of long-lived, highly stable electrochemical actuators, electrochemical capacitors and electrochemical batteries having conjugated polymers as active electrodes as well as for the fabrication of long-lived, highly stable electrochromic devices with polyaniline and polythiophene as coloration materials.

48 Claims, 19 Drawing Sheets

Polyphenylene

Polyphenylenevinylene

Polyphenylenesulfide

Polyfluorene

Poly(p-pyridine)

Poly(p-pyridalvinylene)

Polypyrrole

Polyaniline

Polythiophene

Polythiophenevinylene

Polyfuran

Polyacetylene

Pyridinium   Pyridazinium   Pyrimidinium   Pyrazinium

Imidazolium   Pyrazolium   Thriazolium   Oxazolium

Triazolium   Ammonium   Pyrrolidinium   Pyrrolinium

Pyrrolium   Piperidinium

LONG-LIVED CONJUGATED POLYMER ELECTROCHEMICAL DEVICES INCORPORATING IONIC LIQUIDS

RELATED CASES

This nonprovisional patent application claims priority from provisional application 60/258,381 for "Stable Conjugated Polymer Electrochemical Devices Incorporating Ionic Liquids" which was filed on Dec. 23, 2000.

STATEMENT REGARDING FEDERAL RIGHTS

This invention was made with government support under Contract No. MDA972-99-C-0004 awarded by the U.S. Defense Advance Research Projects Agency to Santa Fe Science and Technology, Inc., Santa Fe, N. Mex. 87505. The government has certain rights in the invention.

FIELD OF THE INVENTION

The present invention relates generally to ionic liquids (molten salts with generic structures $NR_4^+X^-$, $PR_4^+X^-$, $SR_4^+X^-$, where $NR_4^+$, $PR_4^+$, $SR_4^+$ are ammonium, phosphonium and sulfonium cations, respectively) that are liquid at temperatures $\leq 150°$ C.; mixtures containing ionic liquids, or where the mixture contains at least one ionic liquid and one or more ionic solids; and solutions of ionic liquids in molecular (non-ionic) liquids; or combinations thereof, for the generation of electroactivity in conjugated polymers and conjugated oligomers and, more particularly, to the development of stable conjugated polymer electrochemical devices incorporating ionic liquids, such as electrochemical actuators, electrochromic devices, batteries, electrochemical capacitors, light emitting electrochemical cells, fuel cells, sensors, and photoelectrochemical solar cells.

BACKGROUND OF THE INVENTION

In the development of electrochemical devices, electrolyte plays an important role. Good electrolytes have high conductivity, large electrochemical windows, excellent thermal and chemical stability, low viscosity and negligible vapor pressure. The advantages of organic electrolytes over aqueous ones for the fabrication of electrochemical devices have been appreciated. However, the operating voltage and lifetime of the resulting electrochemical devices are affected by the water content of the electrolyte due to the miscibility of water with the organic solvents employed. Additionally, the evaporation of the organic solvents limits the long-term operation of the devices. Thus, lack of volatility and lack of miscibility with water are critical properties of electrolytes for the fabrication of durable and stable electrochemical devices, especially those devices with open configuration structures such as actuators.

To ensure the high performance of conjugated polymer based electrochemical devices, the electrolyte should also contain ions capable of enhancing the electroactivity of conjugated polymers.

Ionic liquids are not new; for example, ethylammonium nitrate ($[EtNH_3][NO_3]$), which has a melting point of 12°C, was first described in 1914 (see, e.g., P. Walden, *Bull. Acad. Imper. Sci.* (St. Petersburg), p. 1800 (1914); and S. Sugden and H. Wilkins, *J. Chem. Soc.*, p. 1291 (1929)). Typically, ionic liquids consist of nitrogen-containing organic cations and inorganic anions. Since they are nonvolatile and nonflammable, have high thermal stability, and are relatively inexpensive to manufacture, ionic liquids have found use in chemical syntheses, particularly catalysis, and in separation technology.

Ionic liquids are inherently ionically conductive; that is, they have high conductivity and large electrochemical windows; that is, the electrochemical potential range over which the electrolyte is not reduced or oxidized at an electrode. These features make ionic liquids good electrolytes. Moreover, their low volatility and nonflammable properties are important for the fabrication of stable electrochemical devices. When compared with other electrolytes, ionic liquids have the advantage that they can be obtained in a very dry state which makes them especially suitable for applications in electrochemical systems from which moisture must be excluded over long periods of operation. Moreover, the thermal stability and low volatility of ionic liquids permit the operation of electrochemical devices under high temperature and high vacuum. There are many ways of combining different cations and anions to make ionic liquids. Therefore, high electroactivity for conjugated polymers which results in high performance, conjugated polymer electrochemical devices, can be generated by optimizing the composition of ionic liquids used therewith.

Ionic liquids have received considerable attention as electrolytes in various electrochemical devices (see, e.g., A. B. McEwen et al., *Electrochemical Capacitors II*, F. M. Delnick et al., Editors, PV 96-25, p. 313; V. R. Koch et al., *J. Electrochem. Soc.* 142, L116 (1995); V. R. Koch et al., *J. Electrochem. Soc.* 143, 788 (1996); J. S. Wilkes and M. J. Zaworotko, *J. Chem. Soc. Commun.*, p. 965 (1992); R. T. Carlin et al., *J. Electrochem. Soc.* 141, L73 (1994); P. Bonhôte et al., *Inorg. Chem.* 35, 1168 (1996); and N. Papageorgiou et al.,*J. Electrochem. Soc.*, 143, 3099 (1996)). However, the use of ionic liquids as electrolytes for the fabrication and development of conjugated polymer electrochemical devices has not been previously addressed. Nevertheless, the study of ionic liquids as electrolytes in conjugated polymer electrochemistry is very limited. Osteryoung et al. have shown that a number of electroactive polymers (polypyrrole, polythiophene and polyaniline) can be prepared in ionic liquids and the obtained polymer films showed electroactivity in these ionic liquids (see, e.g., P. G. Pickup and R. A. Osteryoung, *J. Am. Chem. Soc.* 106, 2294 (1984); P. G. Pickup and R. A. Osteryoung, *J. Electroanal. Soc.* 195, 271 (1985); L. Janiszewska and R. A. Osteryoung, *J. Electrochem. Soc.* 134, 2787 (1987); L. Janiszewska and R. A. Osteryoung,*J. Electrochem. Soc.* 135, 116 (1988); and J. Tang et al.,*J Phys. Chem.* 96, 3531 (1992)). The research described in these papers was performed using $AlCl_3$-1-ethyl-3-methylimidazolium chloride systems. It has been stated (U.S. Pat. No. 5,827,602 which issued to V. R. Koch et al.) that a disadvantage of these ionic liquids, and a problem with any ionic liquid containing a strong Lewis acid such as $AlCl_3$, is the liberation of toxic gases when they are exposed to moisture. Moreover, in "Electrochemistry of polyaniline in ambient-temperature molten salts" by Jinsong Tang and Robert A. Osteryoung, Synth. Met. 44 (1991) p. 307–319, the authors state that the PANI deteriorates in the ionic liquid. Thus, the highly reactive nature of Lewis acids used to form room-temperature melts limits the kinds of organic and inorganic compounds which are stable in these media, and such salts typically decompose below 150° C.

In "Formation and electrochemistry of polyaniline in ambient temperature molten salts", by Jinsong Tang and Robert A. Osteryoung, Synth. Met. 45 (1991) p. 1–13, the authors state that ambient-temperature molten salts consisting of a mixture of aluminum chloride with 1-ethyl-3-methyl-imidazolium chloride ($[EMIM][Cl]$) or N-butylpyridinium chloride ($[BPY][Cl]$) are viewed as promising materials for secondary battery electrolytes.

However, the preparation of electroactive (PANI) in molten salt systems of different compositions is described, and the cooperation of conjugated polymers with ionic salts to form electroactive devices is not discussed.

Accordingly, it is an object of the present invention to use ionic liquids and solutions containing ionic liquids as electrolytes to enable electroactivity in conjugated polymer devices.

Another object of the invention is to provide stable conjugated polymer electrochemical devices such as electrochemical actuators, electrochromic devices, batteries, electrochemical capacitors, light emitting electrochemical cells, fuel cells, sensors, and photoelectrochemical solar cells using ionic liquids in conjunction with conjugated polymers.

Yet another object of the invention is to produce electroactivity in polyaniline in ionic liquids and to provide polyaniline-based durable and stable electrochemical actuators, batteries and electrochemical capacitors using ionic liquids.

Yet another object of the invention is to produce electroactivity in polyaniline and polythiophene in ionic liquids and to generate polyaniline and polythiophene-based durable and stable electrochromic devices.

Still another object of the present invention is to combine the unique properties of conjugated polymers (for example, light weight, low cost, redox reversibility, and high charge capacity) and ionic liquids (for example, high conductivity, wide electrochemical window, negligible evaporation, and chemical and thermal stability) to fabricate secondary batteries with high performance and long lifetime.

Another object of the invention is to provide a synthesis for thin film conjugated polymers.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method for inducing a response in a long-lived electrochemical device hereof includes the steps of: contacting a conjugated polymer working electrode and a counter electrode with an ionic liquid having an anion and a cation; and applying a voltage between the working electrode and the counter electrode, whereby the response is induced in the long-lived electrochemical device.

Preferably, the ionic liquid is stable in the presence of water and the conjugated polymer is stable in the presence of the ionic liquid.

In another aspect of the invention in accordance with its objects and purposes, the long-lived electrochemical device hereof includes in combination: a conjugated polymer working electrode; a counter electrode; an ionic liquid having an anion and a cation in contact with both the working electrode and the counter electrode; and an electronic power supply for applying a voltage between the working electrode and the counter electrode, whereby a response is induced in the electrochemical device.

Preferably, the ionic liquid is stable in the presence of water and the conjugated polymer is stable in the presence of the ionic liquid.

Benefits and advantages of the present invention include the flexibility of structure and function of ionic liquids which result from combining cations and anions having different properties. Since the composition of ionic liquids has a significant influence on the electroactivity and actuation of conducting polymers, by changing the ionic liquid cation and more effectively, the anion, ion exchange and thus the behavior of conjugated-polymer devices may be varied. Moreover, ionic liquids have high chemical stability, water immiscibility, negligible vapor pressure, and wide electrochemical windows. Therefore, conjugated polymer devices using ionic liquids as electrolytes have been found to have great stability and long life. Electrochromic devices using conjugated polymer electrodes and ionic liquids have also been found to consume very low electrical power.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings:

FIG. 1c shows examples of ionic liquids based on various monocations, while

FIG. 2a and FIG. 2b show cyclic voltammograms and length changes, respectively, under isotonic conditions for PANI($CF_3SO_3$), while

FIG. 7a shows a comparison of evaporation rates between propylene carbonate (PC) and ionic liquids, while

DETAILED DESCRIPTION

Briefly, the present invention includes ionic liquids, mixtures containing ionic liquids, and solutions of ionic liquids and/or super-cooled ionic liquids in molecular (non-ionic) liquids, for the generation of electrochemical response in conjugated polymers for use as long-lived, stable electrochemical devices such as actuators, electrochemical capacitors, batteries, fuel cells, and electrochromic devices. Polyaniline electrochemical actuators and electrochemical capacitors and polyaniline and polythiophene electrochromic devices incorporating ionic liquids have been demonstrated as specific embodiments of the invention. The ionic liquids used for the demonstration of the present invention have a wide liquid range and offer the advantages of high thermochemical and electrochemical stability which are critically important for the fabrication of highly stable electrochemical devices.

Reference will now be made in detail to the present preferred embodiments of the invention, examples of which are illustrated in the accompanying drawings. Similar or identical structure are described using identical callouts.

Figure 1A:
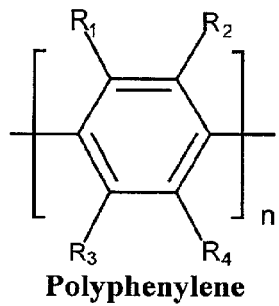
FIGS. 1a and 1b show several conjugated polymers suitable for use in the electroactive devices of the present invention, including polyphenylene, polyphenylenevinylene, polyphenylenesulfide, polyfluorene, poly(p-pyridine), poly(p-pyridalvinylene), polypyrrole, polyaniline, polythiophene, polythiophenevinylene, polyfuran, polyacetylene, and substituted versions thereof.
Figure 1A:
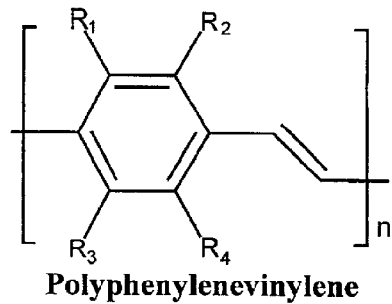
Figure 1A:
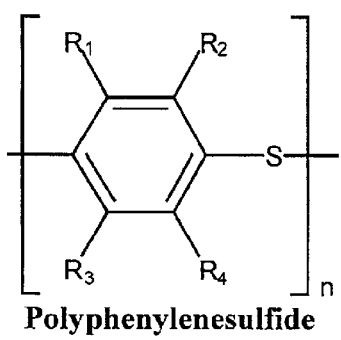
Figure 1A:
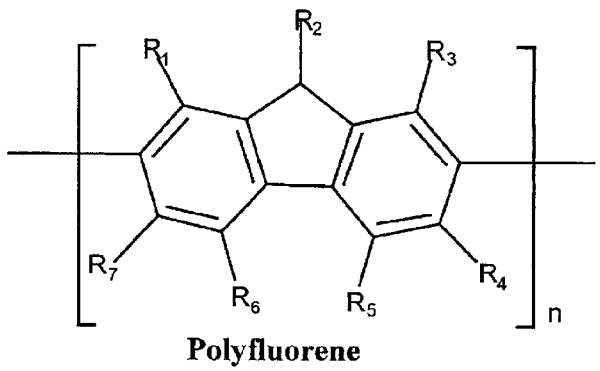
Figure 1A:
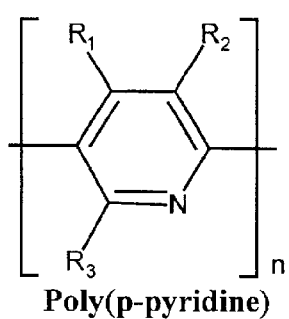
Figure 1A:
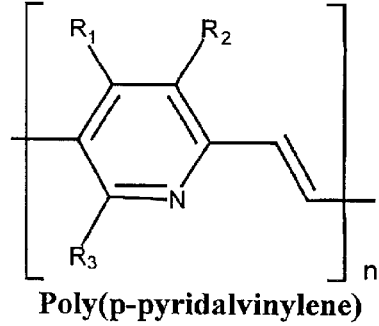
Figure 1B:
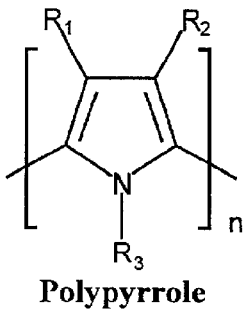
Figure 1B:
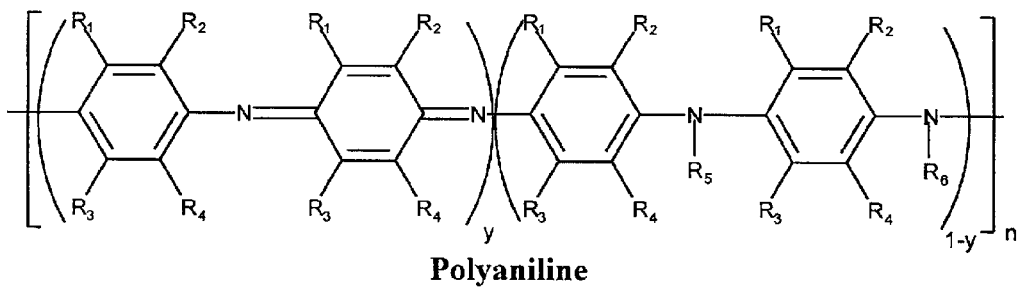
Figure 1B:
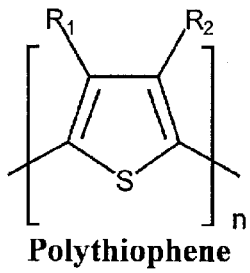
Figure 1B:
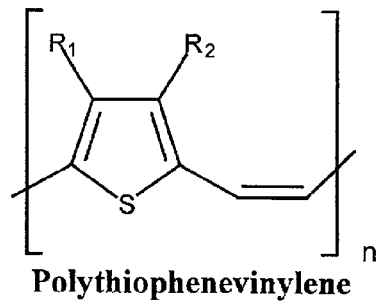
Figure 1B:
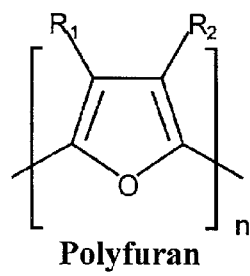
Figure 1B:
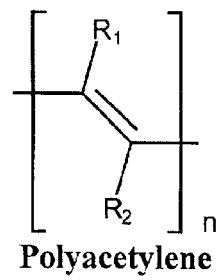

FIGS. 1a and 1b show several conjugated polymers suitable for use in the electrochemical devices of the present invention, including polyphenylene, polyphenylenevinylene, polyphenylenesulfide, polyfluorene, poly(p-pyridine), poly(p-pyridalvinylene), polypyrrole, polyaniline, polythiophene, polythiophenevinylene, polyfuran, polyacetylene, and substituted versions thereof.

For polyphenylene, polyphenylenevinylene, and polyphenylenesulfide and for the monomers and oligomers of the monomers of these polymers, derivatives are defined where $R_1$, $R_2$, $R_3$ and $R_4$ are independently selected from the group consisting of a hydrogen atom or a nonconjugated substituent, such as, for example, hydrocarbyls, substituted hydrocarbyls, hydrocarbyloxys and poly(oxyalkylene)s. They may be straight chain but more typically are branched. The term "hydrocarbyl" refers to an organic radical primarily composed of carbon and hydrogen which may be aliphatic, alicyclic, aromatic or combinations thereof. It includes, without limitation "alkyls", "alkenyls", and "aryls" and "cycloalkyls". The term "substituted hydrocarbyl" refers to a hydrocarbyl group having from 1 to 3 substituents selected from the group consisting of hydroxy, acyl, acylamino, acyloxy, alkoxy, alkenyl, alkynyl, amino, aminoacyl, aryl, aryloxy, carboxy, carboxyalkyl, cyano, cycloalkyl, guanidino, halo, heteroaryl, heterocyclic, nitro, thiol, thioaryloxy, thioheteroaryloxy, and the like. Preferred substituents include hydroxy and cyano. The term "hydrocarbyloxy" refers to an organic radical primarily composed of carbon, oxygen and hydrogen which may be aliphatic, alicyclic, aromatic or combinations thereof. It includes, without limitation "alkoxys", "alkoxyalkyls" and "aryloxys".

The term "poly(oxyalkylene)" refers to a polyether having on average from about 2 to about 100 oxyalkylene units where the alkylene portion is most typically a 2 or 3 carbon alkylene, that is ethylene or propylene. The term "alkoxy" refers to the group alkyl-O—. Such alkoxy groups include, by way of example, methoxy, ethoxy, n-propoxy, iso-propoxy, n-butoxy, tert-butoxy, sec-butoxy, n-pentoxy, n-hexoxy, 1,2-dimethylbutoxy, and the like. The term "alkoxyalkyl" refers to the group -alkylene-O-alkyl, which includes by way of example, methoxymethyl (CH$_3$OCH$_2$—), methoxyethyl (CH$_3$—O—CH$_2$—CH$_2$—) and the like. The term "alkenyl" refers to alkenyl groups preferably having from 2 to 8 carbon atoms and more preferably 2 to 6 carbon atoms and having at least 1 and preferably from 1–2 sites of alkenyl unsaturation. Such alkenyl groups include ethenyl (—CH═CH$_2$), n-propenyl (i.e., allyl) (—CH$_2$—CH═CH$_2$), iso-propenyl (—C(CH$_3$)═CH$_2$), and the like. The term "alkyl" refers to monovalent alkyl groups preferably having from 1 to 8 carbon atoms and more preferably 1 to 6 carbon atoms. This term is exemplified by groups such as methyl, ethyl, n-propyl, iso-propyl, n-butyl, iso-butyl, n-hexyl, and the like. The term "aryl" refers to an unsaturated aromatic carbocyclic group of from 6 to 14 carbon atoms having a single ring (e.g., phenyl) or multiple condensed rings (e.g., naphthyl or anthryl). Preferred aryls include phenyl, naphthyl and the like. The term "aryloxy" refers to the group aryl-O—where the aryl group is as defined herein including optionally substituted aryl groups as also defined herein.

The term "cycloalkyl" refers to cyclic alkyl groups or cyclic alkyl rings of from 3 to 8 carbon atoms having a single cyclic ring or multiple condensed rings which can be optionally substituted with from 1 to 3 alkyl groups. Such cycloalkyl groups include, by way of example, single ring structures such as cyclopropyl, cyclobutyl, cyclopentyl, cyclooctyl, 1-methylcyclopropyl, 2-methylcyclopentyl, 2-methylcyclooctyl, and the like, or multiple ring structures such as adamantanyl, and the like. Examples of suitable cycloalkyl rings include single ring structures such as cyclopentane, cyclohexane, cycloheptane, cyclooctane, and the like, or multiple ring structures. Preferred cycloalkyl rings include cyclopentane, cyclohexane, and cycloheptane.

For polyfluorene and for the monomer and oligomers of the monomer of this polymer, derivatives are defined where $R_1$, $R_2$, $R_3$, $R_4$, $R_5$, $R_6$ and $R_7$ are independently selected from the group consisting of a hydrogen atom or a substituent, such as, for example, alkyl, alkenyl, alkoxy, cycloalkyl, cycloalkenyl, alkanoyl, alkylthio, aryloxy, hydroxy, acyl, acylamino, acyloxy, alkoxy, alkenyl, alkynyl, amino, aminoacyl, aryl, aryloxy, carboxy, carboxyalkyl, cyano, cycloalkyl, guanidino, halo, heteroaryl, heterocyclic, nitro, thiol, thioaryloxy, thioheteroaryloxy and cycloalkyl.

For poly(p-pyridine) and poly(p-pyridalvinylene) and for monomers and oligomers of the monomers of these polymers, derivatives are defined where $R_1$, $R_2$ and $R_3$ are independently selected from the group consisting of a hydrogen atom or a substituent, such as, for example, alkyl, alkenyl, alkoxy, cycloalkyl, cycloalkenyl, alkanoyl, alkylthio, aryloxy, hydroxy, acyl, acylamino, acyloxy, alkoxy, alkenyl, alkynyl, amino, aminoacyl, aryl, aryloxy, carboxy, carboxyalkyl, cyano, cycloalkyl, guanidino, halo, heteroaryl, heterocyclic, nitro, thiol, thioaryloxy, thioheteroaryloxy and cycloalkyl.

For polyaniline and for the monomer and oligomers of the monomer of this polymer, derivatives are defined where $R_1$, $R_2$, $R_3$, $R_4$, $R_5$ and $R_6$ are independently selected from the group consisting of a hydrogen atom or a substituent, such as, for example, alkyl, alkenyl, alkoxy, cycloalkyl, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, arylsulfonyl, carboxylic acid, halogen, cyano, or alkyl substituted with one or more sulfonic acid, carboxylic acid, halogen, nitro, cyano or epoxy moieties; or any two R substituents taken together are an alkylene or alkenylene group completing a 3, 4, 5, 6 or 7 membered aromatic or alicyclic carbon ring, which ring may include one or more divalent heteroatoms of nitrogen, sulfur, sulfinyl, sulfonyl or oxygen.

For polypyrrole and for the monomer and oligomers of the monomer of this polymer, derivatives are defined where $R_1$, $R_2$ and $R_3$ are independently selected from the group consisting of a hydrogen atom or a substituent, such as, for example, alkyl, alkenyl, alkoxy, cycloalkyl, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, arylsulfonyl, carboxylic acid, halogen, cyano, or alkyl substituted with one or more sulfonic acid, carboxylic acid, halogen, nitro, cyano or epoxy moieties; or any two R substituents taken together are an alkylene or alkenylene group completing a 3, 4, 5, 6 or 7 membered aromatic or alicyclic carbon ring, which ring may include one or more divalent heteroatoms of nitrogen, sulfur, sulfinyl, sulfonyl or oxygen.

For polythiophene, polythiophenevinylene and polyfuran and for monomers and oligomers of the monomers of these polymers, derivatives are defined where $R_1$ and $R_2$ are independently selected from the group consisting of a hydrogen atom or a substituent, such as, for example, alkyl, alkenyl, alkoxy, cycloalkyl, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, arylsulfonyl, carboxylic acid, halogen, cyano, or alkyl substituted with one or more sulfonic acid, carboxylic acid, halogen, nitro, cyano or epoxy moieties; or any two R substituents taken together are an alkylene or alkenylene group completing a 3, 4, 5, 6 or 7 membered aromatic or alicyclic carbon ring, which ring may include one or more divalent heteroatoms of nitrogen, sulfur, sulfinyl, sulfonyl or oxygen.

For polyacetylene and for the monomer and oligomers of the monomer of this polymer, derivatives are defined where $R_1$ and $R_2$ are independently selected from the group consisting of a hydrogen atom or a substituent, such as, for example, alkyl, aryl, aliphatic, alkoxy, alkylthio, aryloxy or alkylthioalkyl.

Figure 1C:
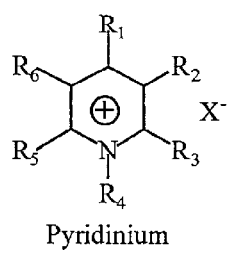
Figure 1C:
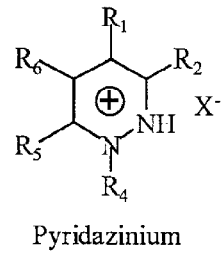
Figure 1C:
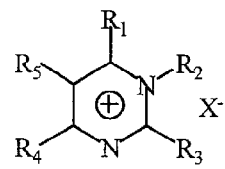
Figure 1C:
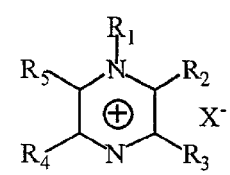
Figure 1C:
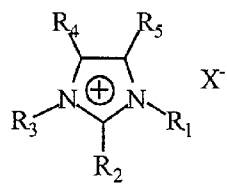
Figure 1C:
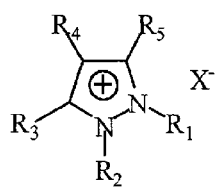
Figure 1C:
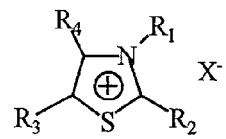
Figure 1C:
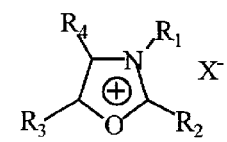
Figure 1C:
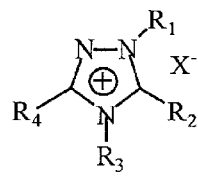
Figure 1C:
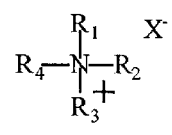
Figure 1C:
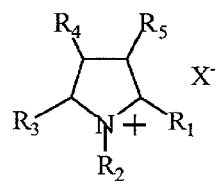
Figure 1C:
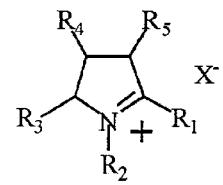
Figure 1C:
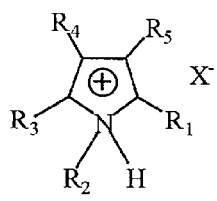
Figure 1C:
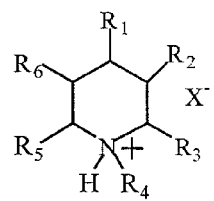
Figure 1D:
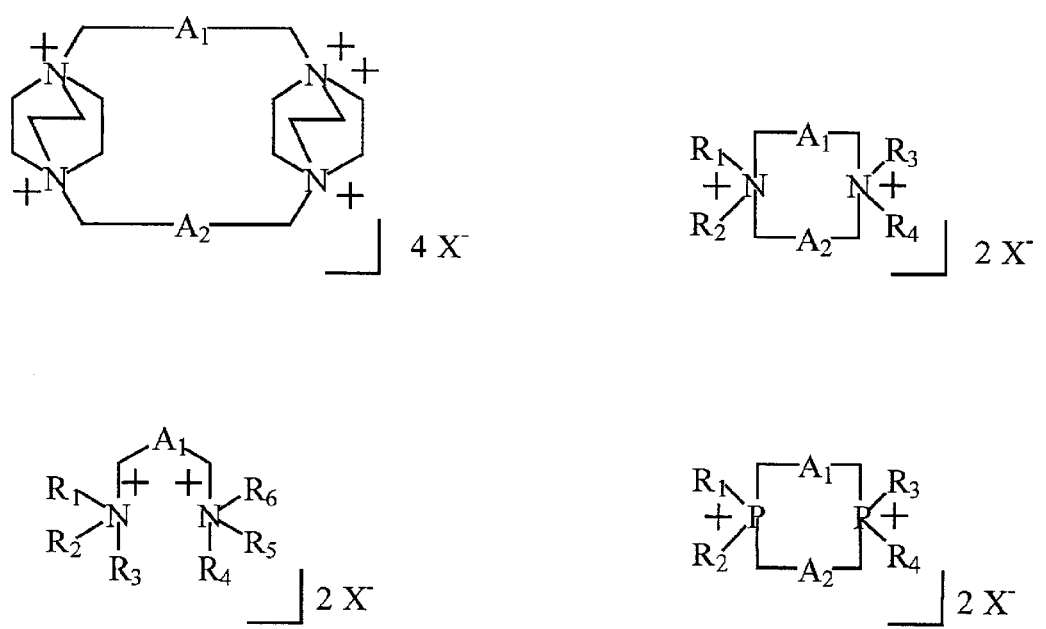
FIG. 1d shows examples of ionic liquids based on polycations.
Figure 2A:
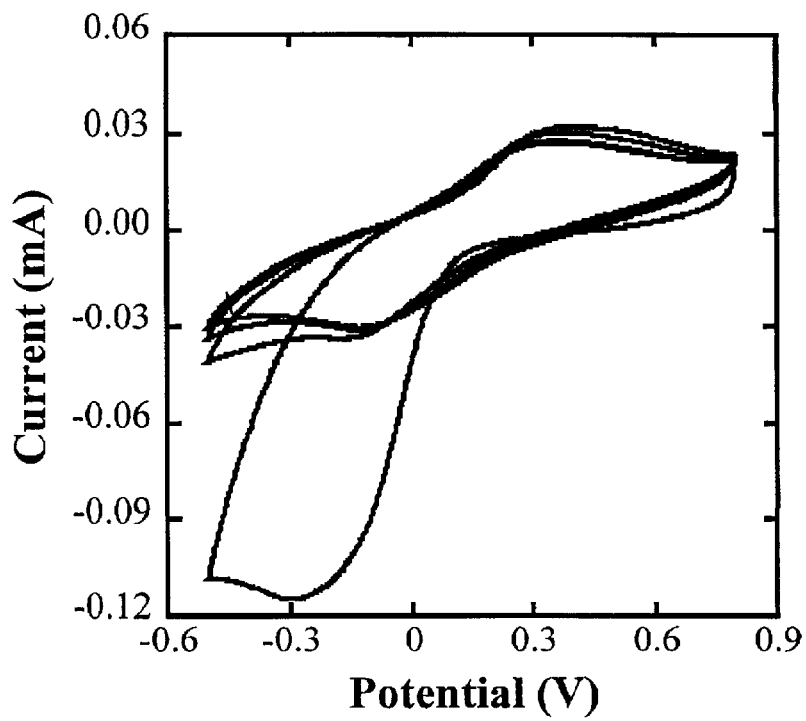
Figure 2B:
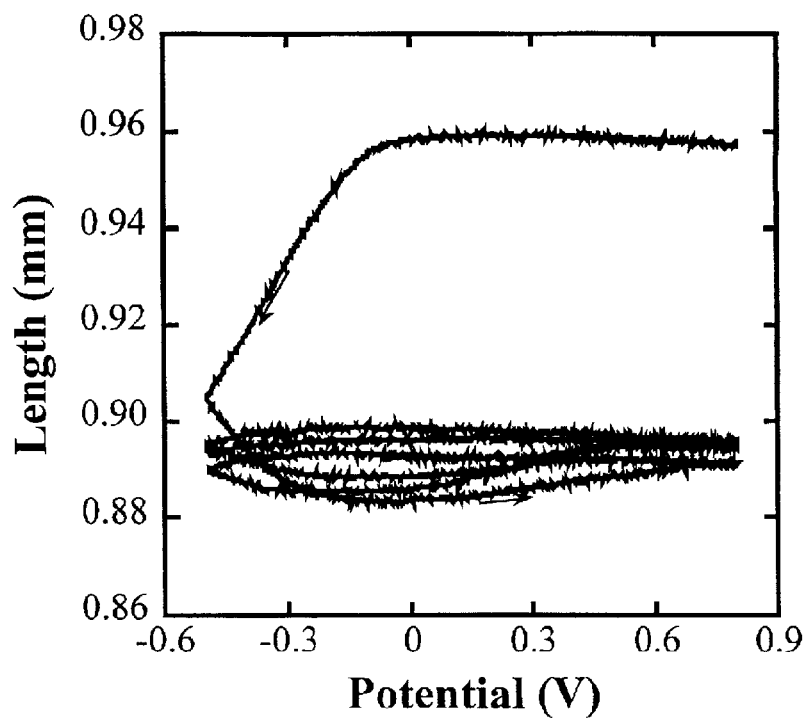
Figure 2C:
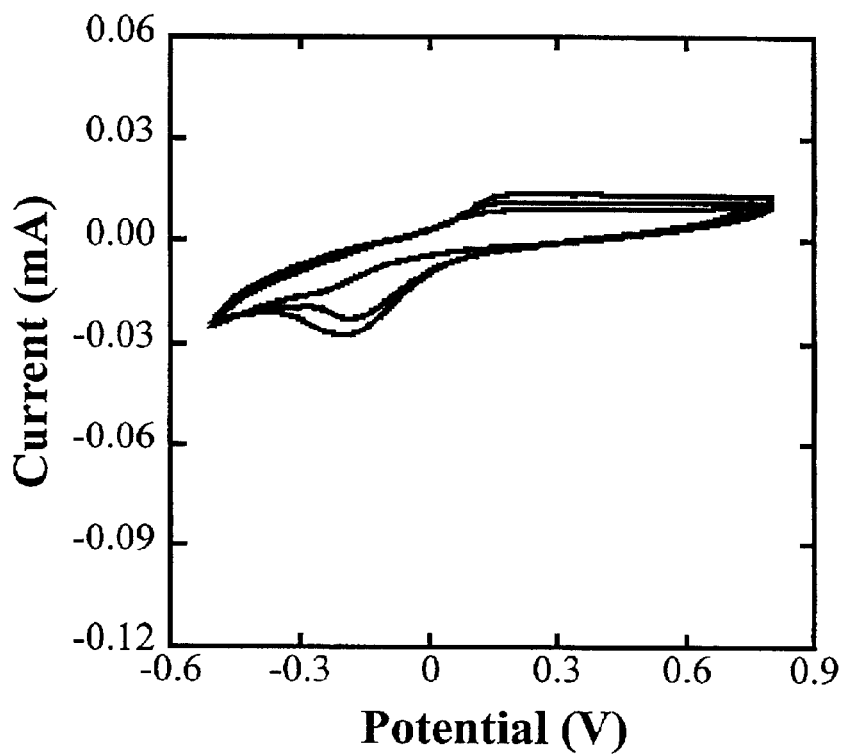
FIG. 2c and FIG. 2d show cyclic voltammograms and length changes, respectively, for PANI (AMPS) solid fibers in [BMIM][$PF_6$], with a scan rate of 5 mV/s for all graphs, and where the initial length of the fibers was 1 cm and force load was 1 g.
Figure 2D:
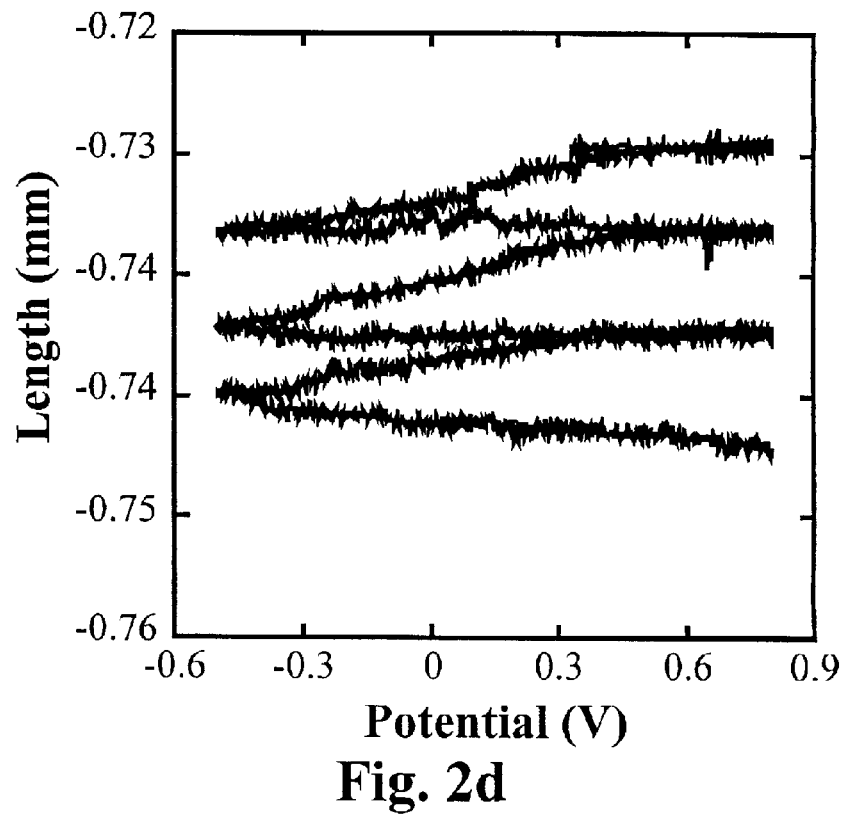
Figure 3A:
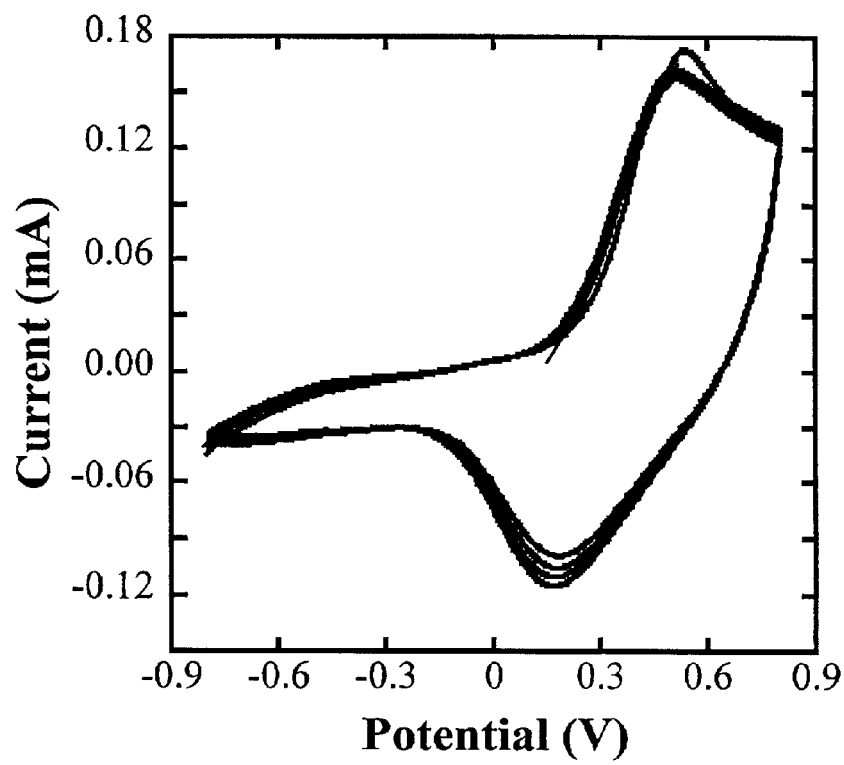
FIG. 3a and FIG. 3b show cyclic voltammograms and length changes, respectively, under isotonic conditions for PANI($CF_3SO_3$) solid fibers in [BMIM][$BF_4$]
Figure 3B:
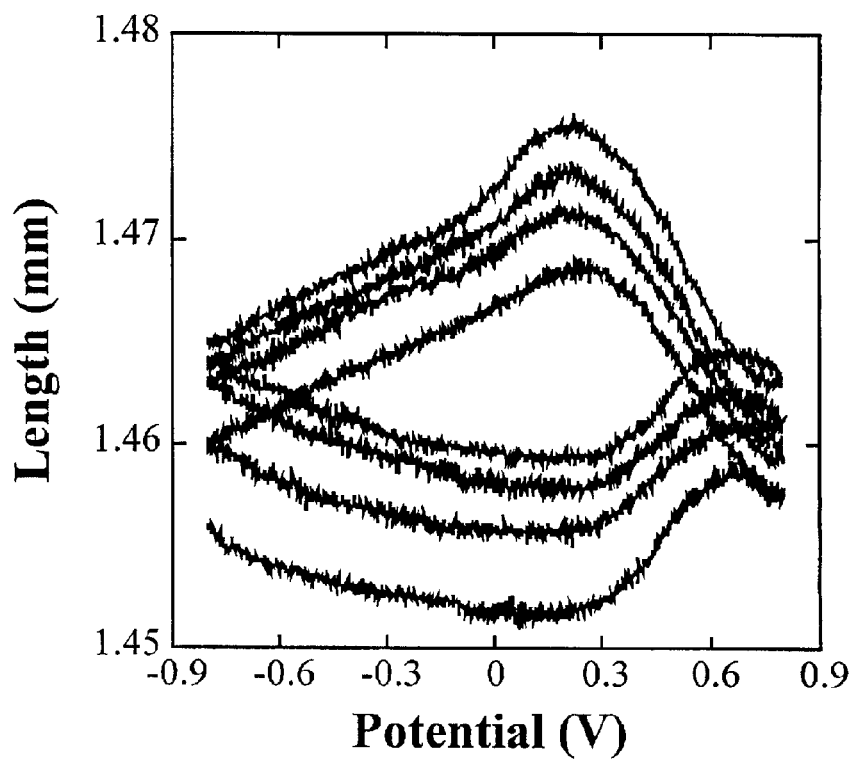
Figure 3C:
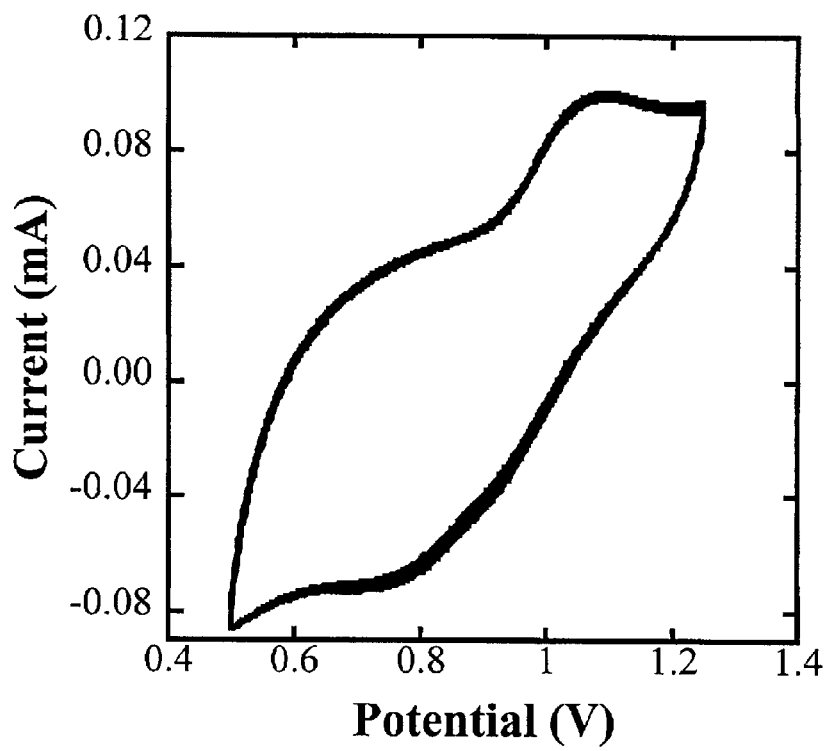
FIG. 3c and FIG. 3d show cyclic voltammograms and length changes, respectively, for PANI($CF_3SO_3$) solid fibers in [EMIM] [$CF_3SO_3$]
Figure 3D:
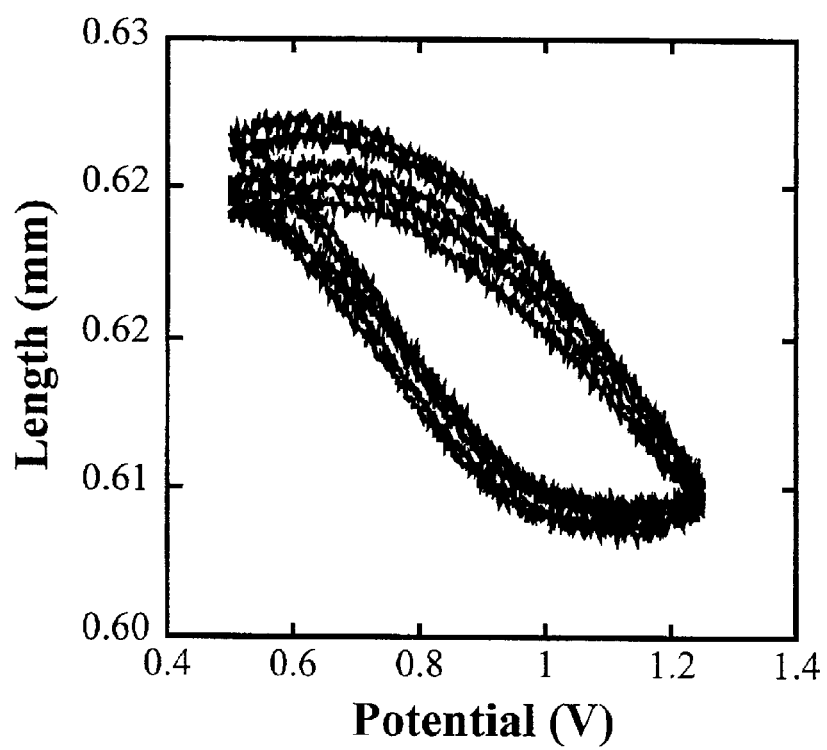
Figure 3E:
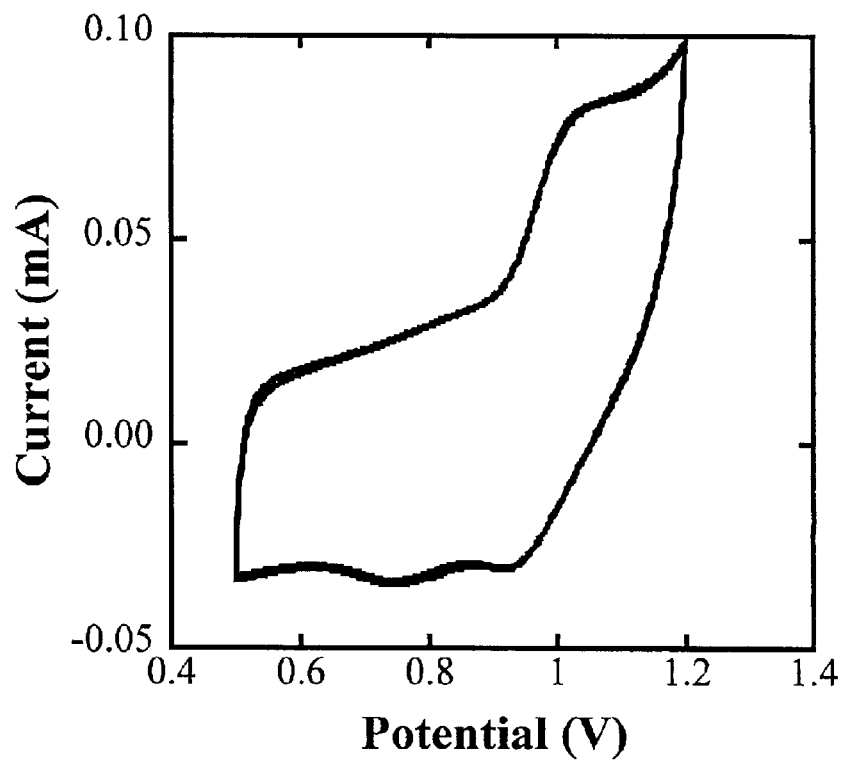
FIG. 3e and FIG. 3f show cyclic voltammograms and length changes, respectively, for PANI(AMPS) solid fibers in [EMIM][$CF_3SO_3$], with a scan rate of 5 mV/s for all graphs, and where the initial length of the fibers was 1 cm and the force load was 1 g.
Figure 3F:
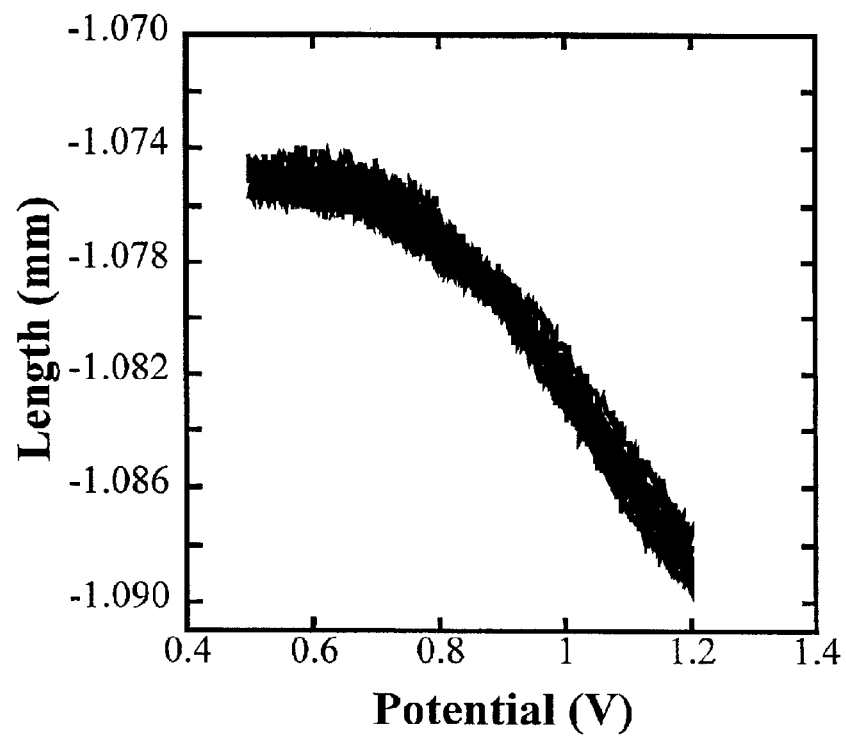

FIG. 1c shows examples of ionic liquids based on various monocations, while FIG. 1d shows examples of ionic liquids based on polycations. The $R_1$, $R_2$, $R_3$, $R_4$, $R_5$, and $R_6$ include H; F; separate alkyl groups having from 1 to 10 carbon atoms or joined together to constitute unitary alkylene radicals having from 2 to 4 carbon atoms thereby forming a ring structure; separate phenyl groups; and substituted alkyl groups, alkylene radicals or phenyl groups. $A_1$ and $A_2$ include alkylene groups and substituted alkylene groups. The anion $X^-$ includes, but is not limited to, $F^-$; $Cl^-$; $Br^-$; $I^-$; $BF_4^-$; $NO_3^-$; $ClO_4^-$; $PF_6^-$; $N(CN)_2^-$; $RSO_3^-$; and $RCOO^-$ where R is an alkyl group; substituted alkyl group; phenyl group; $(CF_3)_2PF_4^-$; $(CF_3)_3PF_3^-$; $(CF_3)_4PF_2^-$; $(CF_3)_5PF_6^-$; $(CF_3)_6P^-$; $(CF_2SO_3^-)_2$; $(CF_2CF_2SO_3^-)_2$; $(CF_3SO_2)_2N^-$; $CF_3CF_2$; $(CF_3)_2CO^-$; $(CF_3SO_2)_2CH^-$; $(SF_5)_3C^-$; $(CF_3SO_2)_3C^-$; $[O(CF_3)_2C_2(CF_3)_2O]_2PO^-$; or $CF_3(CF_2)_7SO_3^-$.

Having generally described the invention, the following EXAMPLES will provide additional details thereof.

EXAMPLE 1

Electroactivity and Actuation of Polyaniline Solid Fibers in Ionic Liquids:

A. Synthesis of Ionic Liquids:

The most cited method for synthesis of 1-methyl-3-alkylimidazole chloride is N-substitution of N-methylimidazole using 1-chloroalkane; however, this reaction proceeds slowly and the resulting material is not very pure. Thus, the most popular reaction of 1-methylimidazole and chlorobutane is carried out for 3 d at 70° C. (See, e.g., "Room temperature ionic liquids as novel media for 'clean' liquid—liquid extraction" by J. G. Huddlestion et al., Chem. Commun., (1998) 1765). Mixing of the reaction mixture presents a problem, as the product of the reaction is denser and more viscous than the reagents and it tends to phase separate. The phase separation of the product results in poor heat transfer and overheating of the reaction mixture when using a heating mantle. As a result of 1-methylimidazole oxidation at elevated temperature, especially in the presence of air (oxygen), this reaction often results in a yellowish product. 1-methyl-3-butylimidazole and 1-methyl-3-ethylimidazole bromides were chosen as precursors for ionic liquids. Bromobutane and bromoethane have higher boiling points than their chloro analogs and this allows for the reaction to be carried out in a liquid phase. Bromoalkanes also react with N-methylimidazole faster and at lower temperature resulting in colorless product with minimal amount of N-methylimidazole oxidation products.

The reactions of N-methylimidazole were carried out using rotary evaporation. A rotary evaporator ensures good mixing for both fluid and viscous liquids, effective temperature control through condensing and recycling of the evaporated reagents, and provides air free environment when used under vacuum.

1-butyl-3-methylimidazolium bromide ([BMIM][Br]) and 1-ethyl-3-methylimidazole bromide ([EMIM][Br]) were prepared by mixing equimolar amounts of 1-methylimidazole and corresponding bromoalkane in round bottomed flask. The reaction was carried out at a temperature between 5 and 7° C. below the boiling temperature of bromoalkane. The reaction was completed within a few hours resulting in clear colorless viscous product.

The product of the reaction was washed with ethyl acetate (on an equal volume basis). The ethyl acetate was then added to the same volume of deionized water and shaken. After phase separation, the water phase was analyzed using UV-Vis spectroscopy. The peak at 291 nm was ascribed to the presence of unreacted N-methylimidazole, as indicated by the decreasing intensity of this peak for the consequent washes of the product with ethyl acetate. Between seven and ten washes were sufficient to eliminate this peak completely.

1-butyl-3-methylimidazolium tetrafluoroborate ([BMIM][BF$_4$] was prepared by a metathesis reaction in aqueous phase from corresponding N,N-alkyimidazolium bromide using potassium tetrafluoroborate. The reaction was carried out at room temperature for 24 h. After the reaction was complete, the [BMIM][BF$_4$] was extracted from the aqueous solution with dichloromethane. The dichloromethane was removed using the rotary evaporator and the [BMIM][BF$_4$] was then dried at 70° C. under dynamic vacuum.

1-ethyl-3-methylimidazolium tetrafluoroborate ([EMIM][BF$_4$]) was prepared by a metathesis reaction using [EMIM][Br] and ammonium tetrafluoroborate. [EMIM][BF$_4$] has low water/dichloromethane partition coefficient; therefore, a non-aqueous synthesis for [EMIM][BF$_4$] was chosen. [EMIM][Br] was first dissolved in acetonitrile, and an equimolar amount of crystalline NH$_4$BF$_4$ was added to the solution. The two-phase mixture was stirred at room temperature for 24 h. The solid NH$_4$Br was filtered off and acetonitrile was removed by distillation at reduced pressure yielding a clear colorless viscous product.

1-butyl-3-methylimidazolium triflate ([BMIM][CF$_3$SO$_3$]) and 1-ethyl-3-methylimidazolium triflate ([EMIM][CF$_3$SO$_3$]) were synthesized using [BMIM][Br] or [EMIM][Br], respectively, and ammonium triflate. The procedure was similar to that described hereinabove for the synthesis of [EMIM][BF$_4$]. The reactions were carried out in acetonitrile at room temperatures for 24 h. The ammonium bromide was filtered off and acetonitrile was removed by distillation at reduced pressure yielding a clear colorless liquid products.

B. Effect of Polyaniline Dopants:

The composition of the conducting polymers affects their electrochemical and thus actuation behavior. With different dopants, the ion exchange between the polymer and the ionic liquid changes. Anion exchange can be enhanced with dopants having small size, while cation exchange can be facilitated with dopants having large size. Cation exchange normally occurs in regions having more positive potential than does anion exchange.

Highly conductive PANI(AMPS) (AMPS: 2-acrylamido-2-methyl-1-propanesulfonate) fibers were used. However, due to its large size (and thus poor binding with ionic liquid cations), AMPS is expelled with difficulty from polymer matrices into the electrolyte resulting in weak electroactivity and no actuation. In order to improve the electroactivity and actuation, AMPS-doped PANI(AMPS) can be exchanged with other anions having smaller size (for example, BF$_4^-$, ClO$_4^-$, PF$_6^-$, CL$^-$, NO$_3^-$, SO$_4^{2-}$, or CF$_3$SO$_3^-$). Dopant exchange was performed in the aqueous solutions of corresponding acids. Three procedures can be used: (1) direct redoping; (2) dedoping-redoping; and (3) electrochemical redoping. Electrochemical means was found to be most effective.

An Aurora Scientific Inc. (Ontario, Canada) Dual-Mode Lever Arm System (Model 300B) was coupled to an Eco-Chemie PGSTAT30 Potentiostat to measure electrochemical mechanical actuation in conjugated polymer fibers. Measurements of the electrochemically induced stress and strain responses were respectively performed in either the isometric (constant length) or isotonic (constant load). The Aurora instrument has been designed to study the transient mechanical characteristics of muscle tissue.

In these experiments, the entire electrochemical cell consists of the polymer fiber (working electrode), a platinum wire (counter electrode), the ionic liquid electrolyte, and the reference electrode. In a typical experiment, one end of a conjugated polymer fiber was attached to the bottom of the electrochemical cell thereby contacting a platinum plate which formed the potential circuit with the counter electrode, while the other end of the fiber was attached to the cantilever arm (using an epoxy resin) which was situated at the top end of the electrochemical cell. The fiber was always adjusted to exactly 1 cm in length when immersed in the ionic liquid. The Aurora instrument measured both the position of the arm (istotonic mode) under constant load, and the force required to maintain a constant position (isometric mode). In isotonic measurements, a fixed force was applied to the fiber, and then the cantilever arm position displacement was recorded upon electrochemical stimulation. By contrast, in isometric measurements, a fixed length was maintained on the fiber by the cantilever arm, and the electrochemically induced force generated from the fiber was measured.

A comparison of cyclic voltammograms and length changes for different solid fibers, with and without dopant exchange, is shown in FIG. 2 hereof. These measurements were performed using a conjugated polymer working electrode, a metal counter electrode and a reference electrode, all in contact with the ionic liquid. The fibers with dopant exchange; that is, PANI(CF$_3$SO$_3$) (FIGS. 2a and 2b), show stronger electroactivity and actuation than originally made PANI(AMPS) fibers (FIGS. 2c and 2d) during the first cathodic scan. This indicates the higher solubility of CF$_3$SO$_3^-$ than AMPS$^-$ in the ionic liquid. Nevertheless, after the first cathodic scan, the observed decrease in electroactivity and actuation for PANI(CF$_3$SO$_3$) fiber, presumably indicate the difficulty of insertion of anion PF$_6^-$ into the polymer matrix from ionic liquid [BMIM][PF$_6$] (the difficult insertion of PF$_6^-$ has also been confirmed in lithium salts containing propylene carbonate, PC, electrolytes by comparison with BF$_4^-$ and ClO$_4^-$). This suggests that the composition of ionic liquids plays an important role in determining the electroactivity and performance of conjugated polymers.

By contrast, due to the difficult expulsion of the AMPS-dopant of the polymer PANI(AMPS) upon reduction, there is a need for cation insertion from the ionic liquid into the polymer to achieve charge compensation. This cation exchange behavior occurs in a more positive potential region than does anion exchange. Originally made polymer PANI (AMPS) or polymers having undergone dopant exchange with some other relatively large anions (for example, $CF_3SO_3^-$, or $(CF_3SO_2)_2N^-$) rather than small anions (for example, $BF_4^-$ $ClO_4^-$ or $Cl^-$) are preferable for the process of cation exchange. This cation exchange behavior is also affected by the composition of ionic liquids as will be discussed hereinbelow.

C. Effect of the Composition of Ionic Liquids:

An advantage of using ionic liquids for the electrochemistry of conjugated polymers is the flexibility of structure and function of ionic liquids which results from combining cations and anions having different properties (such as size, charge density and hydrophobicity/hydrophilicity). As stated hereinabove, the composition of ionic liquids has a significant influence on the electroactivity and actuation of conjugated polymers. By changing the ionic liquid cation and more effectively, the anion, ion exchange and thus the actuation behavior of polyaniline solid fibers may be varied.

For ionic liquids containing small anions (for example, $BF_4$), the insertion/de-insertion of the anion into/out of the polymer is dominant effect and results in the expansion/contraction of the fiber upon oxidation/reduction. By contrast, for ionic liquids containing large anions (for example, $CF_3SO_3^-$), the insertion/deinsertion of the anion becomes difficult so that the charge compensation requires the insertion/desertion of a cation which results in the expansion/contraction of the fiber upon reduction/oxidation. For ionic liquids containing large anions (for example, [EMIM][$CF_3SO_3$]), the greater diffusion of cations than for anions is a useful factor improving the polymer cation exchange behavior (see, e.g., H. Every et al., Electrochim. Acta. 45, 1279 (2000)).

Cyclic voltammograms and length changes for PANI ($CF_3SO_3$) solid fibers in $BF_4^-$ containing ionic liquids as well as PANI($CF_3SO_3$) and PANI(AMPS) solid fibers in $CF_3SO_3^-$-containing ionic liquid are shown in FIG. 3. FIG. 3a and FIG. 3b show cyclic voltammograms and length changes, respectively, for PANI($CF_3SO_3$) solid fibers in [BMIM][$BF_4$]; FIG. 3c and FIG. 3d show cyclic voltammograms and length changes, respectively, for PANI ($CF_3SO_3$) solid fibers in [EMIM][$CF_3SO_3$]; and FIG. 3e and FIG. 3f show cyclic voltammograms and length changes, respectively, for PANI(AMPS) solid fibers in [EMIM][$CF_3SO_3$], with a scan rate of 5 mV/s for all graphs, and where the initial length of the fibers was 1 cm and the force load was 1 g.

As may be observed, the former system behavior indicates that anion exchange dominates, while the latter two systems indicate that cation exchange dominates.

EXAMPLE 2

Effect of the Addition of Cosolvents into Ionic Liquids:

Addition of small amounts of polar organic liquids as cosolvents into ionic liquids can lower the viscosity of the solution and increase the ion disassociation and thus enhance the conductivity of the resulting electrolyte. This improves the electroactivity of conducting polymers. The actuation of the conducting polymer is also improved, perhaps as a result of the simultaneous insertion of solvent molecules and anions into polymer, or perhaps the anions are solvated before insertion. Cosolvents can be selected from the group consisting of linear ethers, cyclic ethers, esters, carbonates, lactones, nitrites, amides, sulfones and sulfolanes.

When PANI($CF_3SO_3$) fibers were studied in 1.0 M $LiBF_4$/PC and [BMIM][$BF_4$], lower actuation was observed in the [BMIM][$BF_4$] although a similar magnitude of electroactivity was observed in both electrolytes. It is likely that the insertion of anions into the polymer matrix as a result of charge compensation occurred in both cases, while the larger actuation observed in PC electrolyte might be attributed to the insertion of solvent molecules as well.

Figure 4A:
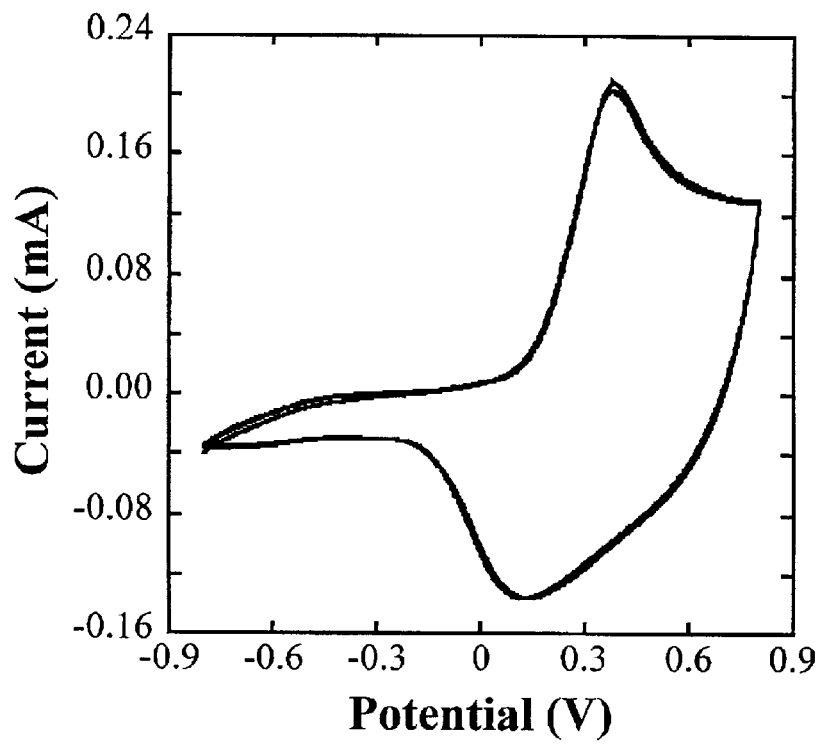
FIG. 4a and FIG. 4b show cyclic voltammograms and length changes, respectively, under isotonic conditions for PANI($CF_3SO_3$) solid fibers in [BMIM][$BF_4$] obtained after the addition of 30% propylene carbonate to the [BMIM] [$BF_4$], all other conditions being the same as for FIGS. 3a and 3b hereof.
Figure 4B:
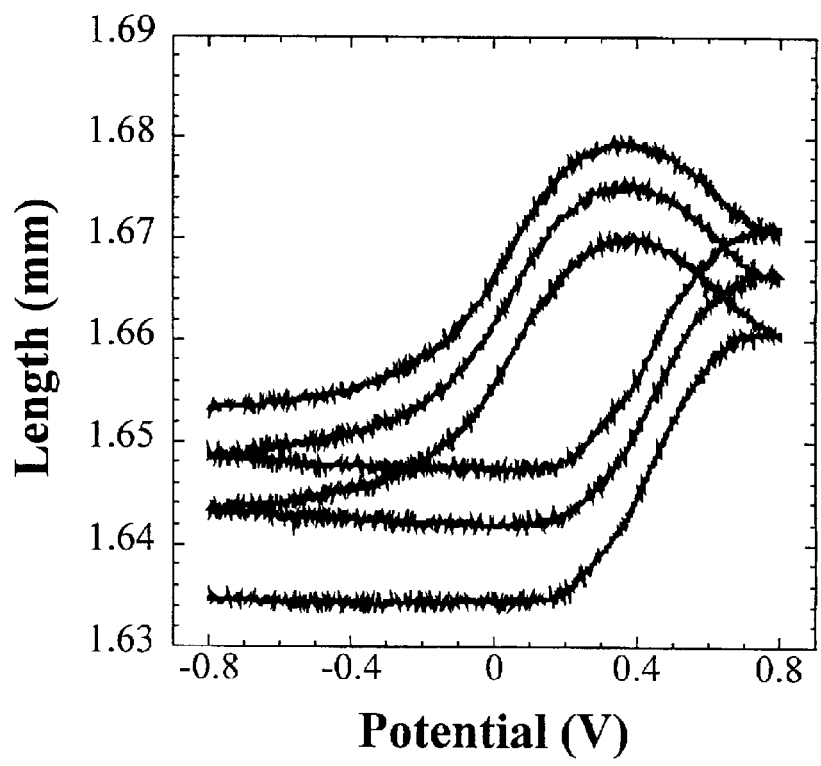

With the addition of PC into [BMIM][$BF_4$], the electroactivity was improved slightly but the actuation (length change) was enhanced by a factor of 6. Cyclic voltammograms and length changes for PANI($CF_3SO_3$) fibers in [BMIM][$BF_4$] before and after the addition of PC (to a concentration of 30%) are shown in FIG. 3 and FIG. 4, respectively. FIG. 4a and FIG. 4b show cyclic voltammograms and length changes, respectively, for PANI($CF_3SO_3$) solid fibers in [BMIM][$BF_4$] obtained after the addition of 30% propylene carbonate to the [BMIM][$BF_4$], all other conditions being the same as for FIGS. 3a and 3b hereof.

EXAMPLE 3

A. Stable Performance of the Devices:

Lifetime tests were performed by stepping the applied potential for PANI($CF_3SO_3$) fibers in 30% PC containing [BMIM][$BF_4$]. Isotonic (FIG. 5) and isometric (FIG. 6) measurements were performed for 2000 and 1000 cycles, respectively.

Figure 5A:
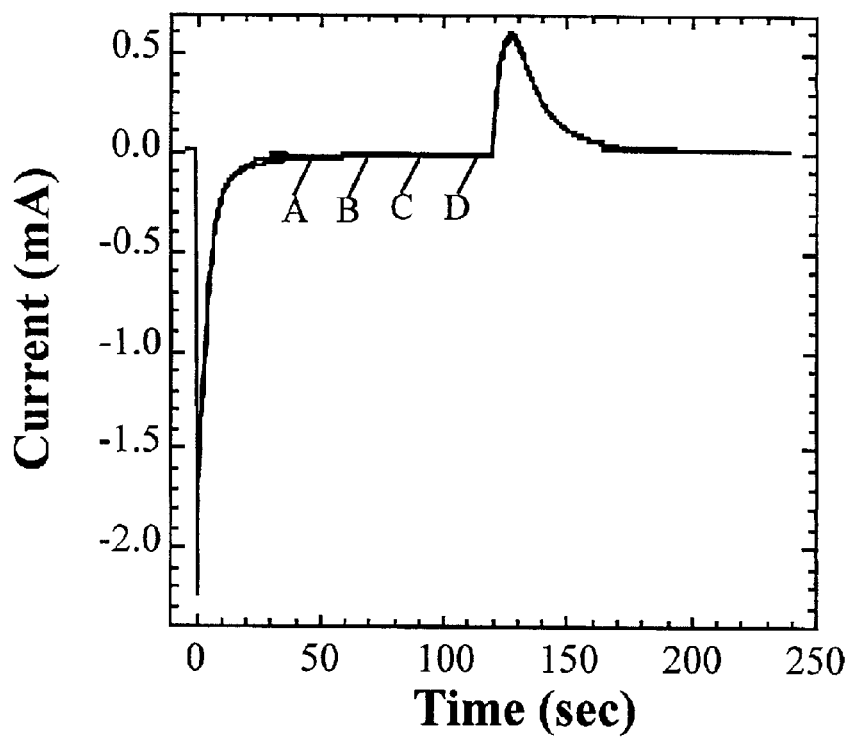
FIG. 5a and FIG. 5b show chronoamperograms and length changes, respectively, under isotonic conditions taken at different cycles for PANI($CF_3SO_3$) solid fibers in 30% propylene carbonate containing [BMIM][$BF_4$] upon potential stepping between −0.2 V and 0.5 V with a pulse width of 120 s, all other conditions being the same as for FIGS. 4a and 4b hereof, where curve A represents the $5^{th}$ cycle; curve B, the $600^{th}$ cycle; curve C, the $1000^{th}$ cycle; and curve D, the $1950^{th}$ cycle.
Figure 5B:
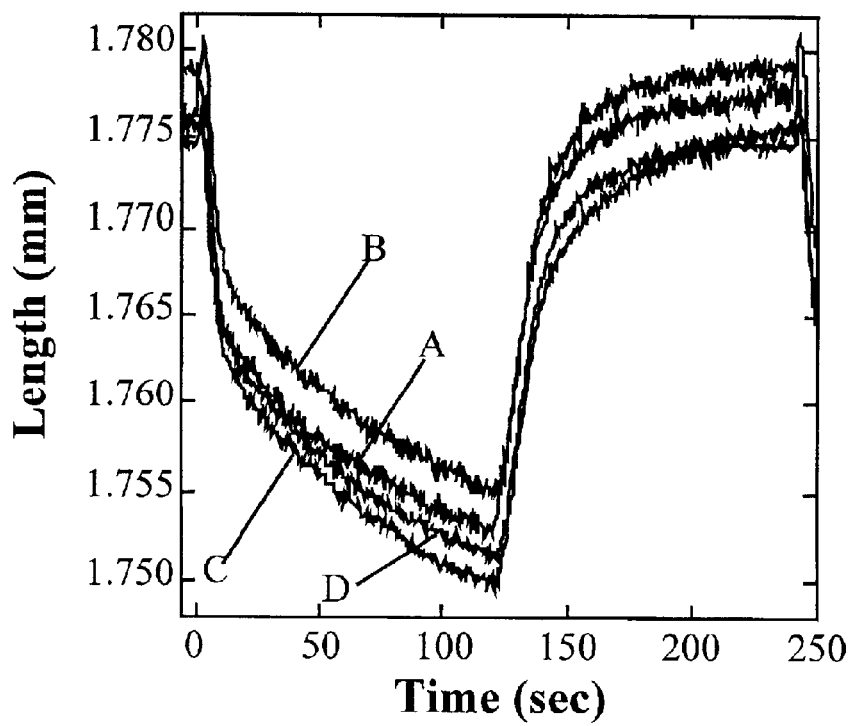

FIG. 5a and FIG. 5b show chronoamperograms and length changes, respectively, taken at different cycles for PANI($CF_3SO_3$) solid fibers in 30% PC-containing [BMIM][$BF_4$] upon potential stepping between −0.2 V and 0.5 V with a pulse width of 120 s, all other conditions being the same as for FIGS. 4a and 4b hereof, where curve A represents the $5^{th}$ cycle; curve B, the $600^{th}$ cycle; curve C, the $1000^{th}$ cycle; and curve D, the $1950^{th}$ cycle.

Figure 6A:
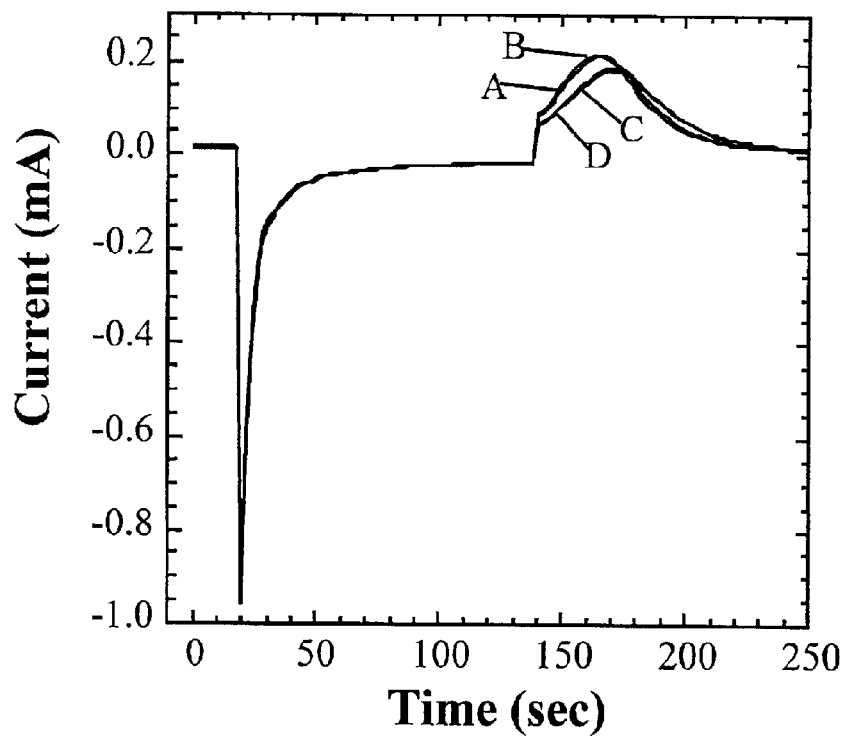
FIG. 6a and FIG. 6b show chronoamperograms and force changes, respectively, under isometric conditions taken at different cycle numbers for PANI(CF$_3$SO$_3$) solid fibers in 30% propylene carbonate containing [BMIM][BF$_4$] upon potential stepping between −0.4 V and 0.5 V with a pulse width of 120 s, all other conditions being the same as for FIGS. 4a and 4b hereof, where curve A represents the 5$^{th}$ cycle; curve B, the 300$^{th}$ cycle; curve C, 700$^{th}$ cycle; and curve D, the 1000$^{th}$ cycle.
Figure 6B:
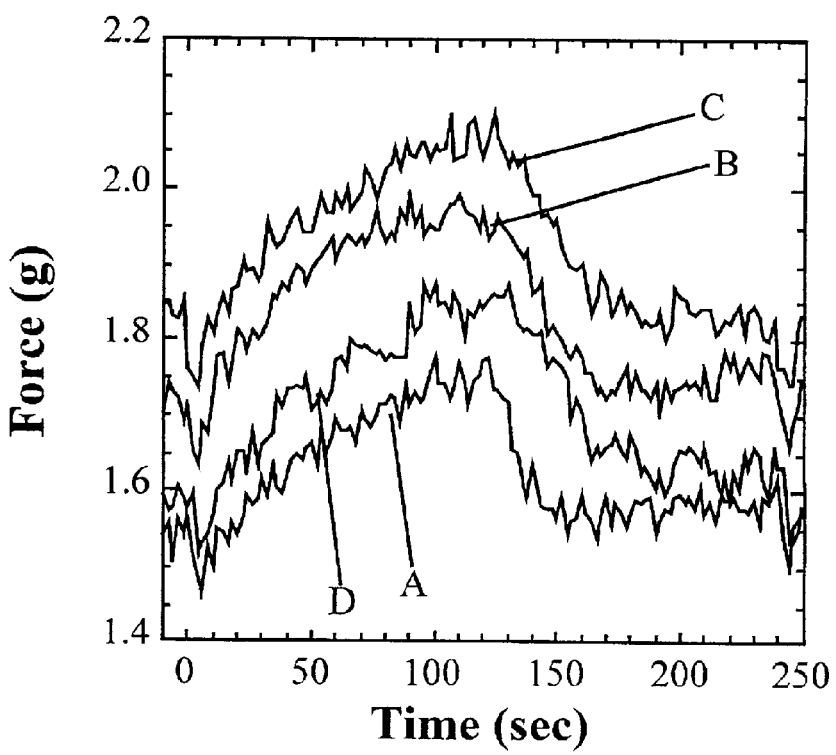

FIG. 6a and FIG. 6b show chronoamperograms and force changes, respectively, taken at different cycle numbers for PANI($CF_3SO_3$) solid fibers in 30% PC-containing [BMIM] [$BF_4$] upon potential stepping between 0.4 V and 0.5 V with a pulse width of 120 s, all other conditions being the same as for FIGS. 4a and 4b hereof, where curve A represents the $5^{th}$ cycle; curve B, the $300^{th}$ cycle; curve C, $700^{th}$ cycle; and curve D, the $1000^{th}$ cycle.

During the isotonic measurements (134 h), currents decreased slightly in the initial cycles and then became stable. The length change during continuous potential stepping was also stable. See TABLE 1.

TABLE 1

| Strain data from FIG. 5. | |
|---|---|
| Cycle Number | Strain (%) |
| 5 | 0.30 |
| 50 | 0.30 |
| 100 | 0.30 |
| 200 | 0.28 |
| 400 | 0.29 |
| 600 | 0.30 |
| 800 | 0.30 |
| 1000 | 0.28 |
| 1200 | 0.28 |
| 1400 | 0.28 |
| 1600 | 0.28 |

After the isotonic measurements, another lifetime test was carried out by measuring force change for 1000 cycles (FIG. 6). After an initial slight decrease, currents became stable. The stress generated during continuous potential stepping was found to be stable. See TABLE 2.

TABLE 2

Stress data from FIG 6.

| Cycle Number | Stress (Mpa) |
| --- | --- |
| 5 | 0.51 |
| 50 | 0.50 |
| 100 | 0.47 |
| 200 | 0.51 |
| 300 | 0.50 |
| 400 | 0.48 |
| 500 | 0.50 |
| 600 | 0.48 |
| 700 | 0.48 |
| 800 | 0.47 |
| 900 | 0.50 |
| 1000 | 0.50 |

B. Stability of the Ionic Liquids

Evaporation behavior of solvents used to make electrolytes plays an important role in determining the lifetime of electrochemical devices. Ideally, a nonvolatile solvent is essential for the fabrication of durable and stable devices, especially for unsealed, solid-state actuators (since actuation will be decreased). The excellent stability of ionic liquids can be observed by comparison with propylene carbonate, PC, an organic solvent frequently used for the fabrication of solid-state electrochemical devices. The behavior of 20% mixtures of the ionic liquid [BMIM][BF$_4$] with the cosolvents, PC, ethylene carbonate, EC, 2,5-dioxahexanedioic acid dimethyl ester, DADME, and 2,5-dioxahexanedioic acid diethyl ester (DADEE), was also investigated.

Figure 7A:
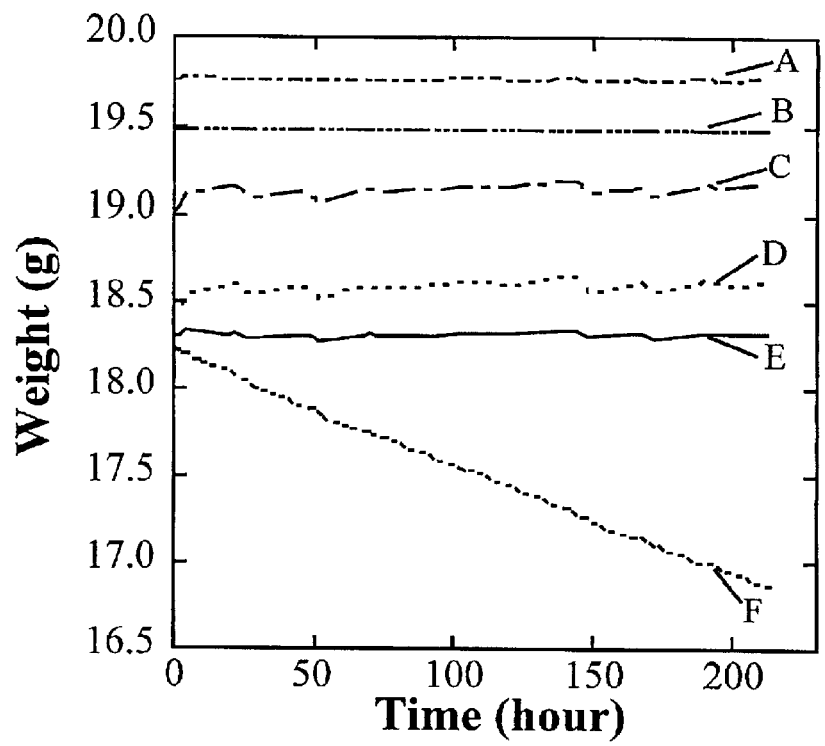

FIG. 7 shows the results of evaporation tests carried out in air at room temperature. The stability of ionic liquids is affected by the sizes of anion and cation. The effect of cation is more pronounced. Stable ionic liquids can be obtained using larger cations, for example, [OMIM][PF$_6$] and [BMIM][PF$_6$]. Ionic liquids containing smaller cations, for example, [EMIM][BF$_4$] and [EMIM][CF$_3$SO$_3$], were found to be more sensitive to environmental factors such as moisture, temperature and humidity. However, compared to PC, all ionic liquids tested showed excellent stability; there was no evaporation observed during the 200 h the ionic liquids were studied, while a continuous weight loss of pure PC was observed during the entire time this material was observed (FIG. 7a).

Figure 7B:
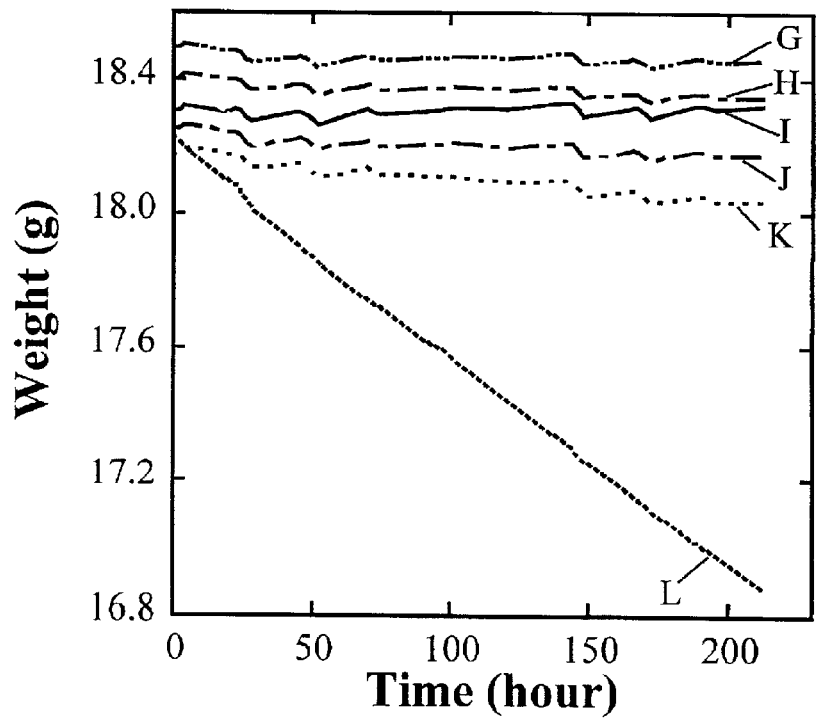
FIG. 7b shows the same comparison for mixtures of different cosolvents (at 20%) containing [BMIM][BF$_4$], where curve A in FIG. 7a contains [BMIM][PF$_6$]; curve B, [OMIM][PF$_6$]; curve C, [EMIM][CF$_3$SO$_3$]; Curve D, [EMIM][BF$_4$]; curve E; [BMIM][BF$_4$]; and curve F, PC, and where curve G in FIG. 7b contains [BMIM][BF$_4$]+20% DADEE; curve H, [BMIM][BF$_4$]+20% DADME; curve I, pure [BMIM][BF$_4$]; curve J, [BMIM][BF$_4$]+20% EC; curve K, [BMIM][BF$_4$]+20% PC; and curve L, PC.

The weight loss for 20% PC- or 20% EC-containing [BMIM][BF$_4$] was observed to be about 2.5% after 200 h which is to be compared with the 26.2% loss observed for pure PC (FIG. 7b). There were no observed losses for 20% DADME- or 20% DADEE-containing [BMIM][BF$_4$].

EXAMPLE 4

Electrochromic Devices Incorporating Conjugated Polymers and Ionic Liquids:

A. General Construction:

In the fabrication of electrochromic devices, advantages have been found for conjugated polymers over inorganic materials (for example, WO$_3$, MoO$_3$ and V$_2$O$_5$), such as low-cost, good processibility for large area applications, and color tailorability for varying regions of coloration.

Figure 8:
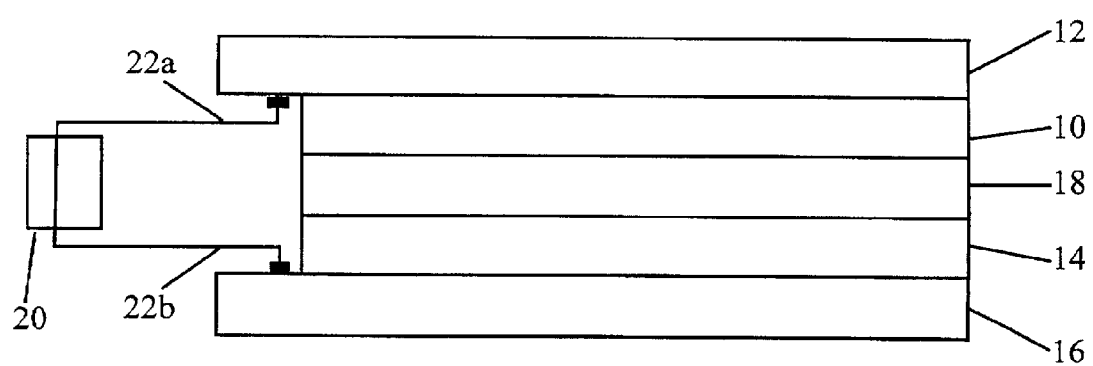
FIG. 8 is a schematic representation of a cross-sectional view of an electrochromic device where an anodically coloring conjugated polymer coated on an ITO glass electrode and a cathodically coloring conjugated polymer coated on an ITO glass electrode sandwich an ionic liquid as the electrolyte.

In accordance with the teachings of the present invention, a schematic representation of a cross-sectional view of a typical ionic-liquid based, conjugated-polymer electrochromic device is shown in FIG. 8. An anodically coloring conjugated polymer, 10, is coated on a conductive, optically transparent glass electrode, 12, and a cathodically coloring conjugated polymer, 14, coated on an ITO glass electrode, 16, which together sandwich an ionic liquid electrolyte, 18, therebetween. The device is operated by power supply, 20, through electrical leads, 22a and 22b.

The anodically coloring polymer changes color from a bleached state to a colored state upon oxidation, while the cathodically coloring polymer changes color from a bleached state to a colored state upon reduction. The conjugated polymers are coated on conductive, transparent glass electrodes such as an indium tin oxide (ITO) coated glass electrode, as an example. Chemical and electrochemical procedures are the two principal methods for polymer coating. In the chemical method, conjugated polymers are synthesized chemically, dissolved in an suitable organic solvent and the resulting solution used for polymer coating onto the ITO glass electrodes by spin-coating, dip-coating, or spray-coating. In the electrochemical method, conjugated polymers are coated onto ITO glass electrodes electrochemically from the corresponding monomer-containing ionic liquids.

An ionic liquid, used as electrolyte, is sandwiched between the anodically coloring polymer and a cathodically coloring polymer-coated ITO glass electrodes. The thickness of the ionic liquid layer between the two electrodes is approximately 100 µm. As a result of the higher viscosity of ionic liquids than that for aqueous or non-aqueous electrolytes, ionic liquids can be used directly without the introduction of a gel or polymer system. The absence of gel/polymer in the electrolyte ensures the higher conductivity of ionic liquid electrolytes and faster ion movement. This effect lowers the operating voltage and increases coloration speed.

B. Stable Performance of Films:

Polyaniline is one of the most frequently studied electrochromic materials. Its electrochromism has been extensively investigated previously in aqueous electrolyte (see, e.g., T. Kobayashi et al., *J. Electroanal. Chem.*, 1984, 161, 419 and T. Kobayashi et al. *J. Electroanal. Chem.*, 1984, 177, 281). However, due to the degradation of polyaniline upon potential scanning to the second redox process (emeraldine⇌pernigraniline), the potential window has to be restricted to the first redox process (leucoemeraldine⇌emeraldine), resulting in low coloration contrast (from transparent yellow to green, instead of from transparent yellow to dark blue). Moreover, although lifetimes of as high as 1 million cycles has been reported for this restricted potential range, the evaporation of the aqueous electrolytes employed limits the practical applications of these solid-state devices.

Alternatively, in order to overcome problems encountered in aqueous electrolytes, polyaniline electrochroism has been investigated in organic liquid electrolytes such as PC-LiClO$_4$ at the Toyota Central R&D Labs (T. Asaoka et al. (1989) 40$^{th}$ ISE Meeting (Kyoto), Ext. Abs., I, 245–6). The authors stated that the switching potential range could be extended to the second process with color change from transparent-colorless to dark blue. Higher color contrast in organic liquid media is an advantage in practical applications. However, only 100 cycles was reported for this device.

In accordance with the teachings of the present invention, polyaniline is electrochemically deposited onto an ITO glass electrode from the ionic liquid [BMIM][BF$_4$] containing aniline. Upon cycling the electrical potential, the resulting film showed two typical pairs of peaks in [BMIM][BF$_4$] (FIG. 9), illustrating the entire redox processes of polyaniline. Increasing the number of cycles did not cause polymer degradation. The appearance of an additional peak between the original two pairs of peaks, which is a common indicator of the degradation of polyaniline in aqueous electrolytes, did not occur.

Figure 9:
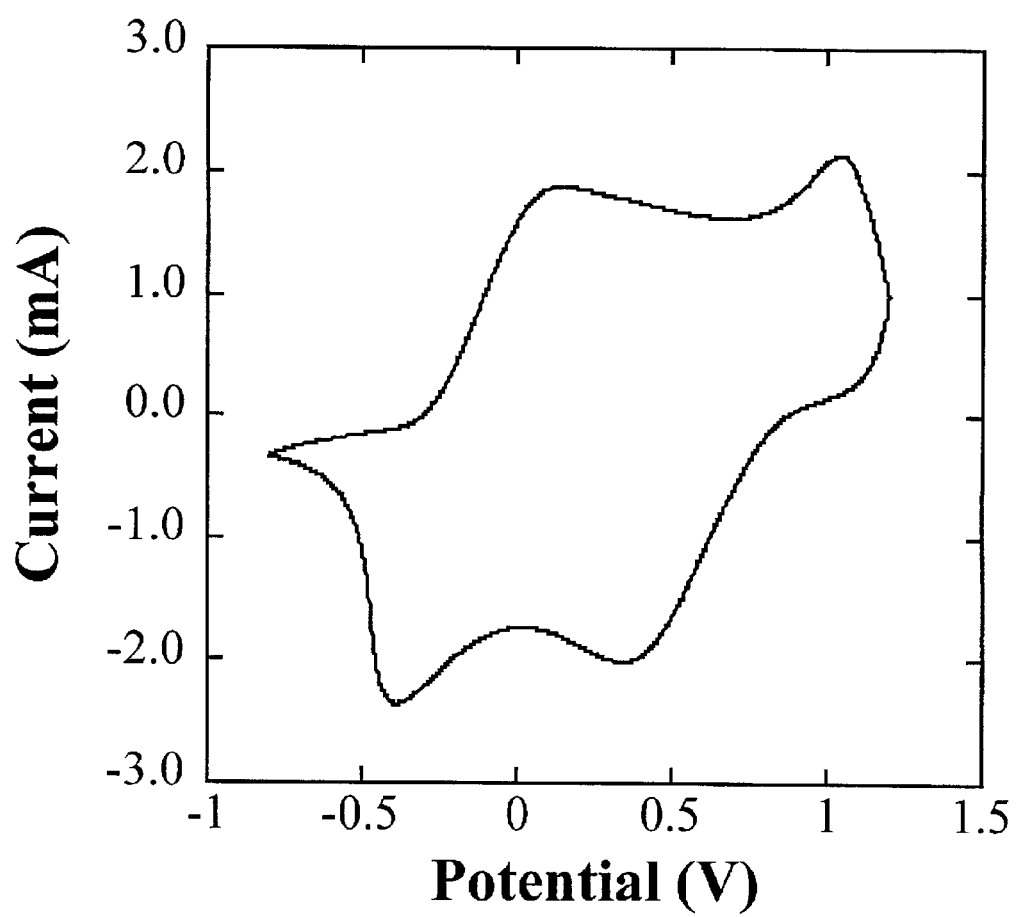
FIG. 9 shows cyclic voltammogram of a polyaniline coated ITO glass electrode obtained in [BMIM][BF$_4$], with an Ag wire reference electrode, a scan rate of 50 mV/s and a 0.7 cm×4.2 cm surface area of ITO coated glass electrode.
Figure 10:
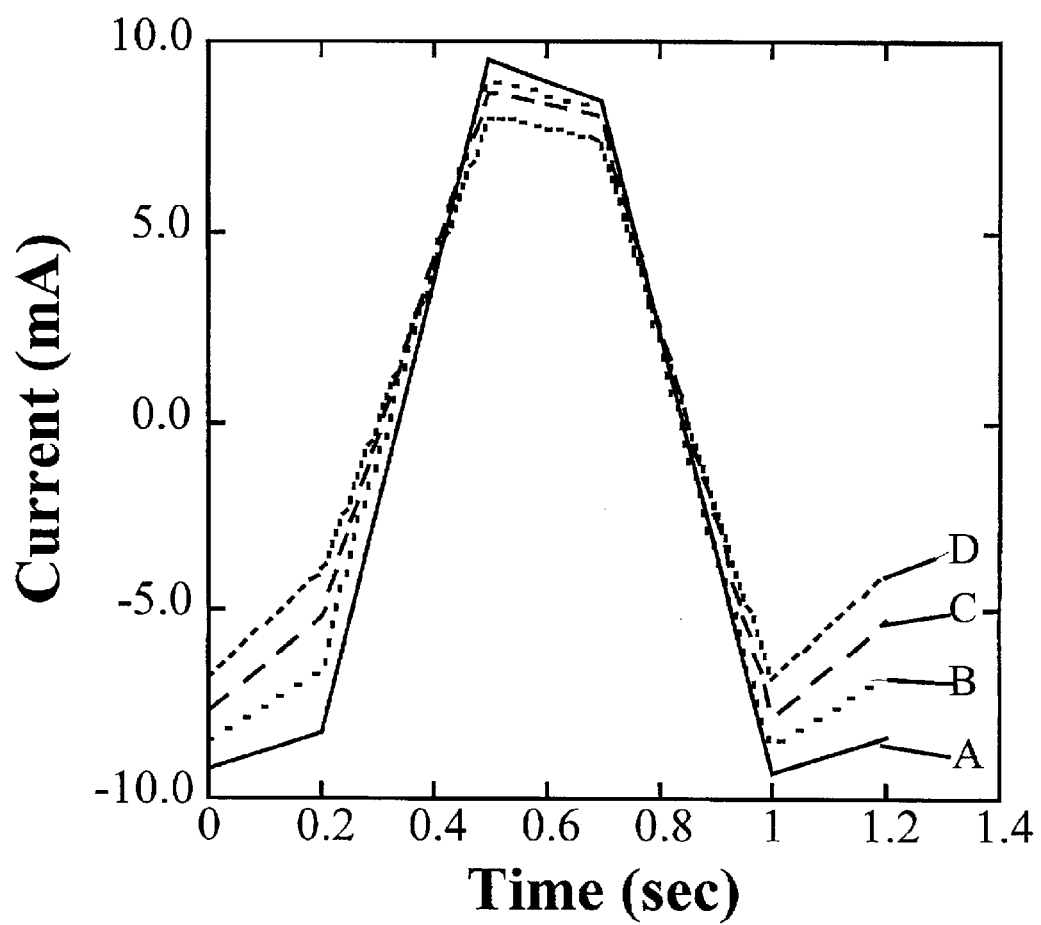
FIG. 10 shows chronoamperograms taken at different cycles in [BMIM][BF$_4$] for the polyaniline coated ITO glass electrode used in FIG. 9, where the potential switching was performed between −0.6 V and +1.1 V with the pulse width of 0.5 s for 1×10$^6$ cycles, and curve A represents the 3$^{rd}$ cycle; curve B, the 330,000$^{th}$ cycle; curve C, the 630,000$^{th}$ cycle; and curve D, the 1,000,000$^{th}$ cycle.

For the film which was used to generate the curve shown in FIG. 9, polyaniline was coated onto ITO glass electrode by potential cycling between −0.2 V and +1.2 V (vs. Ag/Ag$^+$) in 0.5 M aniline and 2 M CF$_3$COOH in [BMIM] [BF$_4$] at 50 mV/s for 15 cycles. Thickness of the resulting polyaniline film on the ITO glass electrode was approximately 0.5 μm. This electrode was rinsed three times in [BMIM][BF$_4$] prior to testing. The cyclic voltammograms of the polyaniline-coated ITO glass electrode were recorded in an electrochemical cell consisting of the polyaniline-coated ITO glass electrode as the working electrode, a 1.5 mm diameter platinum wire as counter electrode, and a 1.0 mm diameter silver as the reference electrode. The electrolyte used was [BMIM][BF$_4$]. Lifetime testing was performed in the same ionic liquid open to the air by potential switching between −0.6 V and +1.1 V (which includes the entire redox process for polyaniline). Color changes between transparent yellow and dark blue were observed upon switching between these two potentials, respectively. Current responses at different cycles during the lifetime test were recorded and shown in FIG. 10. No significant decay in electroactivity or coloration was observed after the continuous switching for 1,000,000 cycles between the fully reduced and fully oxidized states of the polyaniline-coated ITO glass electrode.

Figure 11:
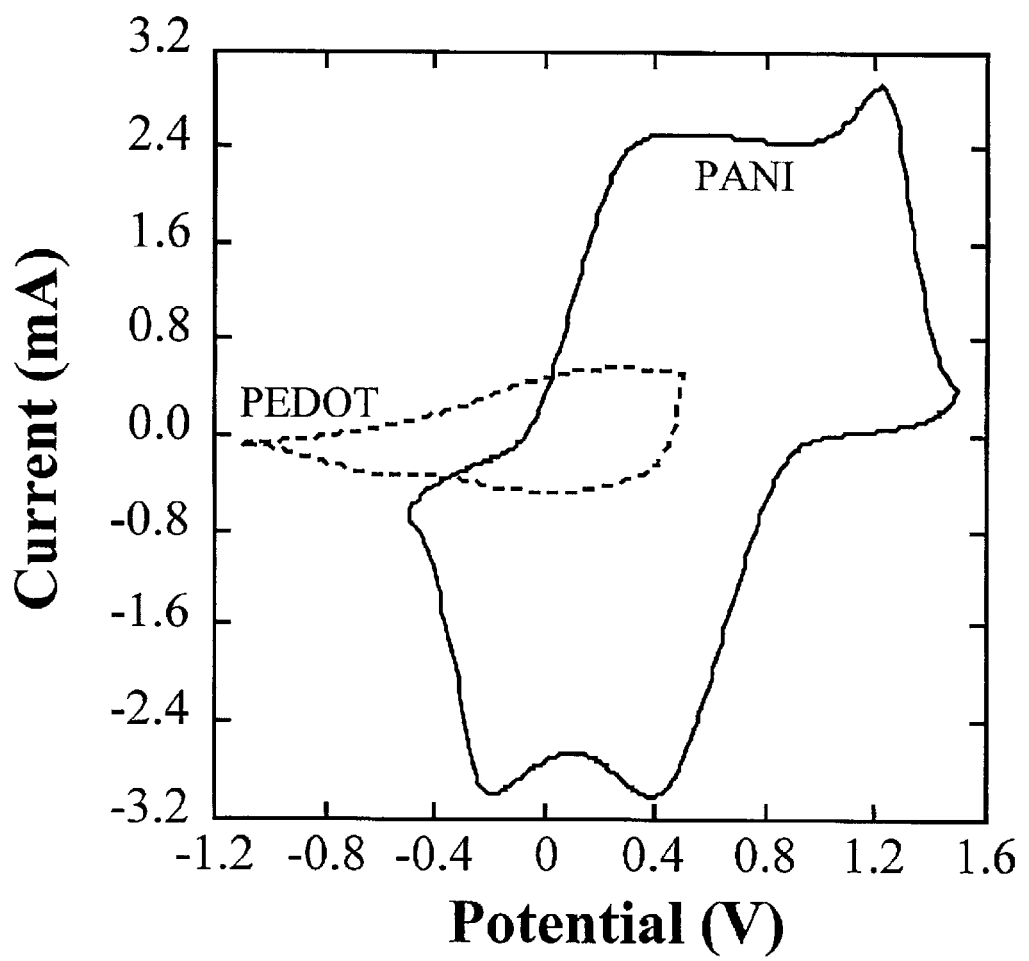
FIG. 11 shows cyclic voltammograms of a PEDOT and a PANI coated ITO glass electrodes obtained in [BMIM][BF$_4$], with an Ag wire reference electrode, a scan rate of 50 mV/s and a 0.7 cm×4.2 cm surface area of ITO coated glass electrode.

C. Fabrication of Ionic Liquid Incorporated Solid-state Conjugated Polymer Electrochromic Devices As an example of the present invention, polyaniline (PANI) and poly(3,4-ethylenedioxythiophene) (PEDOT) were employed as anodically and cathodically coloring polymers, respectively. Each polymer was electrochemically deposited onto a different ITO-coated glass electrode from the corresponding monomer-containing ionic liquid. FIG. 11 shows cyclic voltammograms of the resulting polymer electrodes obtained in [BMIM][BF$_4$] where typical electroactivity of the polymers is observed.

Polyaniline was electrochemically coated onto the ITO coated glass electrode (0.7 cm×4.2 cm) from a polymerization solution of 0.5 M aniline and 2 M CF$_3$COOH in [BMIM][BF$_4$]. The electrochemical polymerization was carried out in an electrochemical cell consisting of the ITO coated glass electrode as working electrode, a 1.5 mm diameter platinum wire as counter electrode, and a 1.0 mm diameter silver as the reference electrode. To coat polyaniline, the ITO coated glass electrode was subjected to potential cycling between 0.2 V and +1.2 V at 50 m V/s for 15 cycles. Thickness of the resulting polyaniline film on ITO coated glass electrode was approximately 0.5 μm. Similarly, poly(3,4-ethylenedioxythiophene) (PEDOT) was electrochemically coated onto an ITO coated glass electrode (0.7 cm×4.2 cm) from a polymerization solution of 0.1 M 3,4-ethylenedioxythiophene in [BMIM][BF$_4$]. The electrochemical polymerization was carried out in an electrochemical cell consisting of the ITO coated glass electrode as working electrode, a 1.5 mm diameter platinum wire as counter electrode, and a 1.0 mm diameter silver as the reference electrode. To coat PEDOT, the ITO coated glass electrode was subjected to potential cycling between −0.5 V and +0.9 V at 50 mV/s for 30 cycles. Thickness of the resulting PEDOT film on ITO coated glass electrode was approximately 0.2 μm.

The PANI- and PEDOT-coated ITO glass electrodes were rinsed three times with [BMIM][BF$_4$] prior to the subsequent testing and device fabrication. Cyclic voltammograms (FIG. 11) of PANI- and PEDOT-coated ITO glass electrodes were recorded in an electrochemical cell consisting of the polymer-coated ITO glass electrode as the working electrode, a 1.5 mm diameter platinum wire as counter electrode, and a 1.0 mm diameter silver wire as the reference electrode at 50 mV/s.

The as-made polymer electrodes were directly used for device fabrication without the necessity of an intermediate drying process as is required for polymers synthesized in aqueous electrolytes. An ionic liquid-incorporated, conjugated-polymer electrochromic device in accordance with FIG. 8 hereof, was fabricated using ITO/PANI/[EMIM] [BF$_4$]/ITO/PEDOT polymer-coated ITO glass electrodes and [BMIM][BF$_4$] as the electrolyte. The ionic liquid [BMIM][BF$_4$] was sandwiched between the two polymer coated electrodes with the polymer films on the inside, by spreading the ionic liquid onto one polymer coated glass and placing the other polymer coated glass electrode onto the ionic liquid. The edge of device was sealed with epoxy resin and an electrical contact was made to each ITO film by attaching a metal wire with silver paint.

Figure 12:
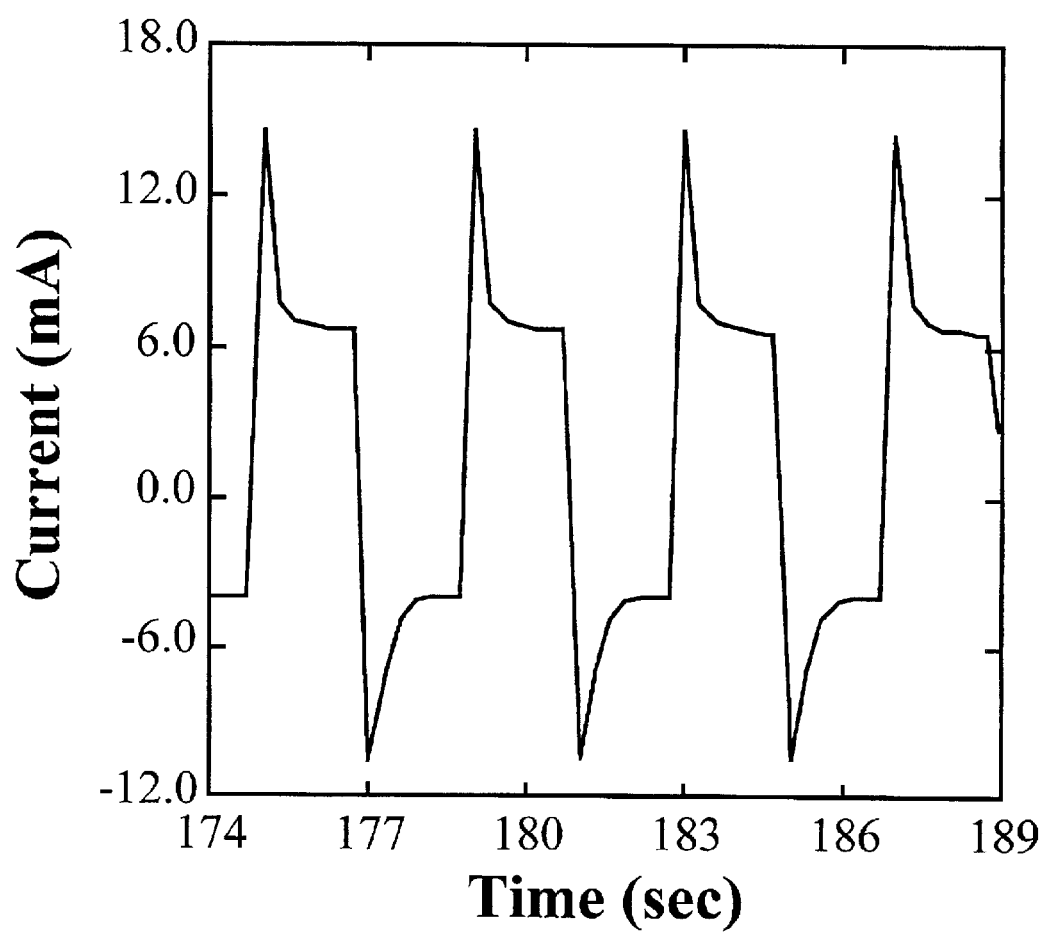
FIG. 12 shows a chronoamperogram obtained for the electrochromic device ITO/PANI/[BMIM][BF$_4$]/PEDOT/ITO fabricated from a PANI-coated ITO glass electrode, a PEDOT-coated ITO glass electrode and [BMIM][BF$_4$] upon voltage switching between −1.0 V and +2.6 V with the pulse width of 2 s.

When a positive voltage (+2.6 V) was applied between the PANI- and PEDOT-coated ITO glass electrodes (PANI as anode and PEDOT as cathode), the PANI film was observed to changed color from transparent yellow to blue, while the PEDOT film changed color from sky blue tint to dark blue, making the device change color from a bleached state to a black state. The application of a negative voltage (−1.0 V) changed the color reversibly to the original bleached state. Complete color change between bleached and colored states can be achieved within 1 s, which is observed in the chronoamperogram of FIG. 12. The color change still can be observed with a cycle time as short as 0.5 s.

The voltages needed to achieve full color switching between bleached state (−1.0V) and colored state (+2.6V) are the difference of the potentials of two individual half cell (polymer electrodes) in the same ionic liquid (FIG. 11 hereof, indicating the very small IR drop between two electrodes in the device, and the highly conductive nature of ionic liquids. This is one advantage of the use of ionic liquids as electrolytes in place of the gel/polymer systems currently in use.

EXAMPLE 5

A. Electrochemical Capacitors Incorporating Conjugated Polymers and Ionic Liquids;

Electrolytic capacitors fall under two broad categories: electrical double-layer capacitors (EDLC), and electrochemical capacitors. In an electrical double-layer capacitor, energy storage is achieved by charging an electrical double layer formed at the interface between an electrolyte and a blocking conductive electrode (e.g. carbon or other similar materials) (see, e.g., E. Frackowiak and F. Béguin, *Carbon*, 39, 937 (2001); and E. Frackowiak et al., *Applied Physics Letters*, 77, 2421 (2000)). For a electrochemical capacitor, energy storage is enhanced by utilizing electroactive materials as electrodes, where the charge stored is the combination of the charging from electrical double layer and the electron transfer from the electroactive material (see, e.g., C. Abrizzini et al., *Adv. Mater.*, 8, 331 (1996); and R. Huggins, *Solid State Ionics*, 134, 179 (2000)).

Use of conjugated polymers as electroactive materials for the fabrication of electrochemical capacitors has attracted considerable attention in the recent years (see, e.g., A. Rudge et al., *J. Power Sources*, 47, 89 (1994); D. Belanger et al., *J. Electrochem. Soc.*, 147, 2923 (2000); and C. Hu and C. Chu, *J. Electroanal. Chem.*, 603, 105 (2001)). Compared to other inorganic materials (e.g. noble metal oxides such as ruthenium oxide and mixed oxides), conjugated polymers possess some advantages such as low cost, high specific capacitance, and fast doping/dedoping during charge-discharge.

One important factor in determining electrochemical capacitor performance is the properties of electrolytes employed. Some problems such as fast electrolyte evaporation, resulting in short life time, and narrow electrochemical window, resulting in low energy density of the device, have been found when aqueous electrolytes are used. These can be partially eliminated by using non-aqueous electrolytes (see, e.g., F. Fusalba et al., *J. Electrochem. Soc.,* 148, A1 (2001)), polymer gel electrolytes (see, e.g., M. Ingram et al., *Electrochim. Acta,* 43, 1601 (1998)) and ionic liquids (see, e.g., A. B. McEwen et al., *Electrochemical Capacitors II,* F. M. Delnick et al., Editors, PV 96-25, p. 313).

However, the use of ionic liquids as electrolytes for the fabrication and development of conjugated polymer electrochemical capacitors has not been previously addressed. Accordingly, one object of the present invention is to combine the unique properties of conjugated polymers (e.g. conductive and electroactive) and ionic liquids (e.g. high conductivity, wide electrochemical window, negligible evaporation, chemical and thermal stability, and water immiscibility) to fabricate electrochemical capacitors with high performance and long lifetime.

An ionic liquid incorporated conjugated polymer electrochemical capacitor consists three essential parts: a polymer anode, a polymer cathode, and an ionic liquid. The basic structure of the electrochemical capacitor is similar to that of the electrochromic device shown in FIG. 8. The ionic liquid is used as electrolyte that is sandwiched between two conjugated polymer electrode active materials. To ensure high specific capacitance of the device, electrode active materials with high surface are preferred. Therefore, porous conjugated polymer electrodes are used in the present invention. In addition, fast diffusion of ionic liquids within the polymer porous structures and thus fast charging/discharging of the device are appreciated, which is important in providing energy in short, high-current pulses. Using different combination of p-dopable (conductive upon losing electrons) and n-dopable (conductive upon gaining electrons) conjugated polymers, three types of ionic liquid incorporated conjugated polymer electrochemical capacitors can be fabricated. In a type I electrochemical capacitor, both anode and cathode contain the same p-dopable conjugated polymer. In a type II electrochemical capacitor, two different p-dopable conjugated polymers with different redox potentials are used. The one with high redox potential is used as cathode, while the other with low redox potential as anode. In a type III electrochemical capacitor, a p-dopable conjugated polymer is used as cathode, and a n-dopable conjugated polymer as anode. Due to the large difference in potentials between a p-dopable and a n-dopable conjugated polymers, a type III electrochemical capacitor has the largest device voltage and thus highest energy density among the three types of possible device design. Therefore, with their wide electrochemical windows, ionic liquids are good candidate to fabricate high energy density conjugated polymer electrochemical capacitors.

In the present invention, an electrochemical capacitor was fabricated from two identical porous polyaniline membranes and ionic liquid [BMIM][BF$_4$].

B. Preparation of Porous Polyaniline Membranes:

Emeraldine base in the amount of 6.38 g (M$_w$=120,000, polydispersity index=6.3 . . . ) was dissolved in 20.8 g of N-methyl-2-pyrrolidinone (NMP) containing 2.27 g of heptamethyleneimine (HPMI) (HPMI/EB molar ratio=1.1) resulting in a solution with a viscosity of ~135000 cP. The solution was degassed and cast on the glass surface. Polymer film was formed by immersion of the cast solution into water for 16 h. The estimated specific surface area of the 75 mm film was approximately 13 m$^2$/g. Several wet films were cast on glass slides (75×50 mm) from the EB solution. The wet films were immersed into deionized water at room temperature for ~16 h. The obtained free-standing membranes were then air-dried. Thickness of the membranes was ~75 μm. The specific surface area of the membrane was approximately 13 m$^2$/g.

C. Gilding of the Porous Polyaniline Membrane:

The obtained polyaniline membrane was then gilded by attaching a gold leaf. The attached gold layer can ensure the uniform potential distribution along the length of the polymer and serve as a current collector of the polymer membrane for device fabrication. Polyaniline (PANI) powder was dissolved in N-methyl-2-pyrrolidinone (NMP) to make a 2 wt % solution to be used as a conducting glue. The 2% PANI/NMP solution was applied to one side of the polyaniline membrane, and a small sheet of gold leaf (thickness: ~5 μm) was applied over that. The assembly was dried on a hot plate at 50 degrees C. for ~1.5 h.

D. Doping of the Gilded Porous Polyaniline Membrane:

Prior to use, polyaniline materials are doped with an acid to ensure that they are in their conductive form. Two pieces (0.5 cm×1.5 cm×75 μm) cut from the above gilded porous polyaniline membrane were doped in 1M CF$_3$SO$_3$H for 24 hours and then dried under dynamic vacuum for 24 h.

E. Fabrication of the Electrochemical Capacitor:

The above two doped gilded polyaniline membranes were then used to fabricate a type I electrochemical capacitor according to FIG. 8 hereof by assembling the gilded membranes with the gold layers on the outside. Ionic liquid [BMIM][BF$_4$] was used as electrolyte and was sandwiched between the two membranes.

F. Performance of the Electrochemical Capacitor:

A cell voltage of 1.2V was obtained for the above ionic liquid incorporated polyaniline electrochemical capacitor, which is higher than that (0.75V) of a similar type I electrochemical capacitor fabricated from polyaniline as electrode active materials but using aqueous electrolytes (see e.g., D. Bélanger et al., *J. Electrochem. Soc.,* 147, 2923 (2000)), and also slightly higher than that (1 V) of another type I polyaniline electrochemical capacitor using non-aqueous electrolytes (see e.g., F. Fusalba et al., *J. Electrochem. Soc.,* 148, A1 (2001)). This should be due to the stability of polyaniline in ionic liquids, which allows the use of polyaniline at potentials beyond the first redox process (leucoemeridine⇌emeraldine) and up to the second redox process (emeraldine⇌pernigraniline), ensuring the high cell voltage of the resulting electrochemical capacitors.

In the electrochemistry of polyaniline in aqueous electrolytes, anodic potential limit is an important role to trigger or avoid its degradation. Degradation of polyaniline at high potentials in aqueous electrolytes has been noticed for years (see e.g., T. Kobayashi et al., *J Electroanal. Chem.,* 177, 281 (1984); R. L. Hand and R. F. Nelson, *J. Am. Chem. Soc.,* 96, 850 (1974); R. L. Hand and R. F. Nelson, *J. Electrochem. Soc.,* 125, 1058 (1978); T. Kobayashi et al., *J. Electroanal. Chem.,* 161, 419 (1984); E. M. Genies et al., *Mol Cryst. Liq. Cryst.,* 121, (181) 1985; E. M. Genies and C. Tsintavis, *J. Electroanal. Chem.,* 200, 127 (1986); E. M. Genies et al., *J. Electroanal. Chem.,* 249, 97 (1988)). Therefore, in order to prevent polyaniline degradation, the anodic potential has to be limited to a small range where only the first redox process (lucoemeridine⇌emeraldine) takes place. This would lead to low cell voltages for the resulting aqueous electrolyte incorporated polyaniline electrochemical capacitors.

Figure 13:
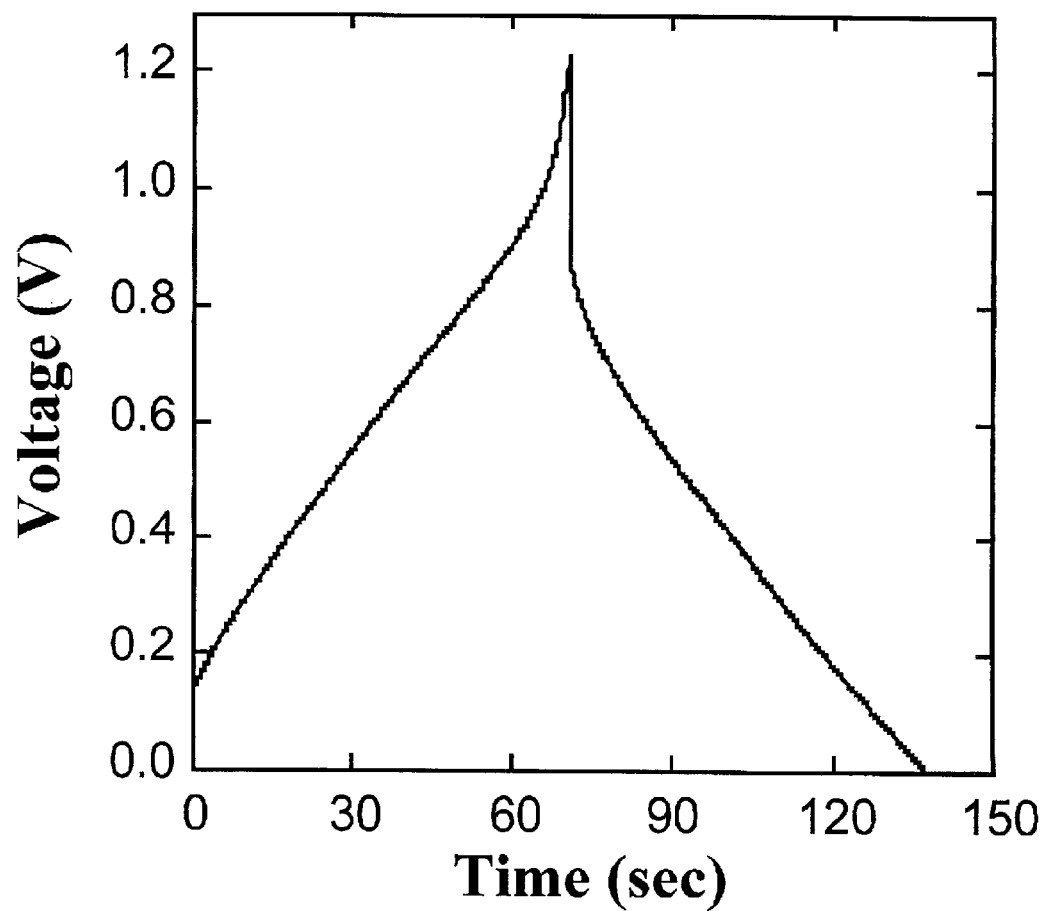
FIG. 13 shows galvanostatic charging and discharging at a current density of 0.7 mA/cm$^2$ obtained for an electrochemical capacitor fabricated from [BMIM][BF$_4$] and two identical porous polyaniline membranes as illustrated in FIG. 8 hereof.

A typical galvanostatic charging-discharging cycle (cell voltage vs. time) between 0 and 1.2V for the present ionic liquid incorporated polyaniline electrochemical capacitor is shown in FIG. 13.

During the charging step, an almost linear variation of the cell voltage was observed, as expected for a capacitor (see, e.g., B. E. Conway, in *Electrochemical Supercapacitors, Scientific Fundamentals and Technological Applications*, Kluwer Academic/Plenum Publishers, New York (1999)). Upon discharging, the cell voltage decreased from 1.2 V to 0 V within ~65 s, which is much shorter than that of a type I electrochemical capacitor based on two electrodes of polypyrrole/carbon paper with 1 M tetramethylammonium trifluoromethanesulfonate in acetonitrile as electrolyte (see e.g., A. Rudge et al., *J. Power Sources*, 47, 89 (1994)). This capacitor needed 1200 s for discharging at 1 mA/cm$^2$ from 1 V to 0 V. Fast diffusion of ionic liquids within the polymer porous structures and thus fast charging/discharging of the device are appreciated in the present work, which is important in providing energy in short, high-current pulses.

EXAMPLE 6

A. The Use of Conjugated Polymers and Ionic Liquids in the Construction of Secondary Batteries:

Due to their unique properties such as light weight, low cost, redox reversibility, and high charge capacity, conjugated polymers (e.g. polyacetylene, polyaniline, polypyrrole, polythiophene, and poly(p-phenylene)) have been used as electrode active materials for the development of secondary batteries.

Electrolytes play an important role in determining the performance of the conjugated polymer secondary batteries. Based on the difference of electrolytes, these batteries can be classified into three major categories. The first group used aqueous electrolytes (see e.g., A. G. MacDiarmid et al., *Mol. Cryst. Liq. Cryst.*, 121, 187 (1985); A. Kitani et al., *J. Electrochem. Soc.*, 133, 1069 (1986); A. G. MacDiarmid et al., U.S. Pat. No. 5,023,149 (1991)). The second group used non-aqueous electrolytes (see e.g., Ricoth Co. U.S. Pat. No. 5,037,713 (1991); F. Goto et al., *Synth. Met.*, 18, 631 (1987); A. Kitani et al., *Bull. Chem. Soc. Japan*, 57, 2254 (1984); E. M. Genies et al., *Synth. Met.*, 18, 631 (1987)). The third group used solid polymeric electrolytes (see e.g., C. Arrbizzani et al., *Synth. Met.*, 28, C663 (1989); C. Li et al., *J. Power Sources*, 39, 255 (1992); Hydro-Quebec, U.S. Pat. No. 4,758,483; T. Ohsawa et al., *Synth. Met.*, 41, 3021 (1991)).

Problems such as narrow electrochemical windows, resulting in low energy density and short life time of the batteries, have been found when aqueous electrolytes are used. In aqueous electrolyte incorporated batteries, the negative electrode material should be a metal with a lower oxidation potential (such as Zn, Al). This makes the open circuit voltage (1.0 V) and the energy density (100 Whr/kg) lower than those of the non-aqueous batteries. On the contrast, in non-aqueous or solid polymeric electrolytes electrolyte incorporated batteries, the wide electrochemical window of the electrolytes allow the use of Li as the negative electrode in polymer batteries (see e.g., P. Novák et al., Chem. Rev., 97, 207 (1997)). Due to the high oxidation potential of Li, high energy density for the resulting batteries can be insured. On the other hand, for a most frequently studied conjugated polymer in polymer batteries, polyaniline, degradation of polymer at high potentials (see e.g., T. Kobayashi et al., *J. Electroanal. Chem.*, 177, 281 (1984); T. Kobayashi et al., *J. Electroanal. Chem.*, 161, 419 (1984); E. M. Genies and C. Tsintavis, *J. Electroanal. Chem.*, 200, 127 (1986); E. M. Genies et al., *J. Electroanal. Chem.*, 249, 97 (1988)) would limit the cell voltage and thus energy density of the resulting batteries. Therefore, secondary batteries with non-aqueous electrolytes are of more practical value (see e.g., S. A. Chen and L. C. Lin, U.S. Pat. No. 5,863,454). However, the use of ionic liquids as electrolytes for the fabrication of conjugated polymer secondary batteries has not been previously addressed in spite of the fact that they have been utilized in secondary batteries with other electrode active materials (see e.g., V. R. Koch et al., U.S. Pat. No. 5,827,602; C. A. Angell et al., U.S. Pat. No. 5,855,809; R. L. Vaughn, U.S. Pat. No. 5,171,649). Construction of ionic liquid incorporated conjugated polymer batteries:

The basic structure of an ionic liquid incorporated conjugated polymer secondary battery is similar to that of an electrochromic device as shown in FIG. 8. Three essential elements of the battery are: a positive electrode, a negative electrode, and an ionic liquid. The ionic liquid is used as electrolyte that is sandwiched between the positive and negative electrodes. Conjugated polymers can be utilized as positive and/or negative electrodes in the battery. However, it is advantageous to fabricate the battery by combining a conjugated polymer (as positive electrode) with a metal (as negative electrode) such as Li, Na, Mg, Zn, MeH$_x$, etc due to the fact that the theoretical values of specific charge of the conjugated polymers are comparable to those of metal oxide electrodes, but are not as high as those of most of the metal electrodes normally used in batteries. More specially, lithium has been preferred as the negative battery electrode in polymer batteries (see e.g., P. Novák et al., *Chem. Rev.*, 97, 207 (1997)), since it has high oxidation potential, high theoretical specific charge, light weight, and ease for extension.

Conjugated polymers can be prepared, both by electrochemical and by chemical methods. Electrochemical methods are often preferred, because they offer the advantage of a precise control of potential and state of charge of the resulting polymer. Three typical electrochemical methods: potentiostatic, potentiodynamic, and galvanostatic, can be used. More specially, in the present invention, conjugated polymers were electropolymerized from monomer containing ionic liquids. The obtained polymers could be used for the fabrication of batteries without drying procedures.

In the case of batteries using conjugated polymers as both negative and positive electrodes, pure ionic liquids were used as electrolytes. However, for batteries using a conjugated polymer as positive electrode and a metal as negative electrode, the addition of a metal salt MX (M=electrode metal, X=any anion of the ionic liquids used in the invention) into the ionic liquids is necessary to ensure the redox reaction occurs at the metal electrode.

During charge-discharge cycle, the electrode reactions for a lithium secondary battery combining a conjugated polymer as positive electrode, lithium as negative electrode, and a Li$^+$ salt (LiX) containing ionic liquid can be expressed as:

charge

Positive electrode (polymer): P$-$e$^-$+X$^-$⇌PX (charging is to the right, while discharging is to the left)

Negative electrode (lithium): Li++e$^-$⇌Li (Charging is to the right, while discharging is to the left)

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for inducing a response in a long-lived electrochemical device which comprises the steps of; contacting a conjugated polymer working electrode and a counter electrode with an ionic liquid having an anion and a cation; and applying a voltage between the working electrode and the counter electrode, whereby the response is induced in the long-lived electrochemical device.

2. The method for inducing a response in a long-lived electrochemical device as described in claim 1, wherein the ionic liquid is stable in the presence of water and wherein the conjugated polymer is stable in the presence of the ionic liquid.

3. The method for inducing a response in a long-lived electrochemical device as described in claim 1, wherein the ionic liquid is stable for voltages applied between the conjugated polymer electrode and the second counter electrode in the range from −3 V to +3 V relative to a standard hydrogen electrode.

4. The method for inducing a response in a long-lived electrochemical device as described in claim 1, wherein the ionic liquid comprises a mixture of ionic liquids.

5. The method for inducing a response in a long-lived electrochemical device as described in claim 1, wherein the ionic liquid comprises at least one ionic solid dissolved in a nonaqueous solvent where the resulting solution being mixed with another ionic liquid.

6. The method for inducing a response in a long-lived electrochemical device as described in claim 1, wherein the anion comprises a weakly coordinating anion.

7. The method for inducing a response in a long-lived electrochemical device as described in claim 6, wherein the anion is selected from the group consisting of $F^-$; $Br^-$; $I^-$; $NO_3^-$; $N(CN)_2^-$; $RSO_3^-$ where R is an alkyl group, substituted alkyl group, or phenyl group; $(CF_3)_2PF_4^-$, $(CF_3)_3PF_3^-$, $(CF_3)_4PF_2^-$, $(CF_3)_5PF^-$, $(CF_3)_6P^-$, $(CF_2SO_3^-)_2$, $(CF_2CF_2SO_3^-)_2$, $(CF_3SO_2)_2N^-$, $CF_3CF_2(CF_3)_2CO^-$, $(CF_3SO_2)_2CH^-$, $(SF_5)_3C^-$, $(CF_3SO_2)_3C^-$, $[O(CF_3)_2C_2(CF_3)_2O]_2PO^-$, and $CF_3(CF_2)_7SO_3^-$.

8. The method for inducing a response in a long-lived electrochemical device as described in claim 6, wherein the anion comprises a small, weakly coordinating anion.

9. The method for inducing a response in a long-lived electrochemical device as described in claim 8, wherein the anion is selected from the group consisting of $F^-$; $Cl^-$; $I^-$; $Br^-$; $NO_3^-$; $BF_4^-$; $ClO_4^-$; $PF_6^-$; $RSO_3^-$; and $RCOO^-$, where R is an alkyl group, substituted alkyl group, or phenyl group.

10. The method for inducing a response in a long-lived electrochemical device as described in claim 1, wherein the cation is selected from the group consisting of pyridinium ions, pyridazinium ions, pyrimidinium ions, pyrazinium ions, imidazolium ions, pyrazolium ions, thiazolium ions, oxazolium ions, triazolium ions, ammonium ions, pyrrolidinium ions, pyrrolinium ions, pyrrolium ions, and piperidinium ions.

11. The method for inducing a response in a long-lived electrochemical device as described in claim 1, wherein the conjugated polymer is selected from the group consisting of polyphenylene, polyphenylenevinylene, polyphenylenesulfide, polyfluorene, poly(p-pyridine), poly(p-pyridalvinylene), polypyrrole, polyaniline, polythiophene, polythiophenevinylene, polyfuran, polyacetylene, and derivatives thereof.

12. The method for inducing a response in a long-lived electrochemical device as described in claim 1, wherein the conjugated polymer comprises a copolymer selected from the group consisting of phenylene, phenylenevinylene, phenylenesulfide, fluorene, p-pyridine, p-pyridalvinylene, pyrrole, aniline, thiophene, thiophenevinylene, furan, acetylene, and derivatives thereof.

13. The method for inducing a response in a long-lived electrochemical device as described in claim 1, wherein the conjugated polymer comprises an oligomer selected from the group consisting of phenylene, phenylenevinylene, phenylenesulfide, fluorene, p-pyridine, p-pyridalvinylene, pyrrole, aniline, thiophene, thiophenevinylene, furan, acetylene, and derivatives thereof.

14. The method for inducing a response in a long-lived electrochemical device as described in claim 1, wherein the ionic liquid further comprises an organic cosolvent.

15. The method for inducing a response in a long-lived electrochemical device as described in claim 14, wherein the organic cosolvent is selected from the group consisting of cyclic ethers, esters, carbonates, lactones, nitrites, amides, sulfones, and sulfolanes.

16. The method for inducing a response in a long-lived electrochemical device as described in claim 1, wherein the electrochemical device comprises an actuator, the response comprises a change in stress and strain of the actuator, and the counter electrode comprises a metal electrode.

17. The method for inducing a response in a long-lived electrochemical device as described in claim 16, wherein the counter electrode comprises a conjugated polymer electrode.

18. The method for inducing a response in a long-lived electrochemical device as described in claim 1, wherein the electrochemical device comprises a capacitor, the response comprises storing a charge on the capacitor and the counter electrode comprises a conjugated polymer electrode.

19. The method for inducing a response in a long-lived electrochemical device as described in claim 18, wherein the conjugated polymer electrodes comprise porous conjugated polymer films having a conducting metal coating on the side thereof facing away from the ionic liquid.

20. The method for inducing a response in a long-lived electrochemical device as described in claim 18, wherein the conjugated polymer electrodes comprise conjugated polymer films electrochemically synthesized using the ionic liquid and having a conducting metal coating on the side thereof facing away from the ionic liquid.

21. The method for inducing a response in a long-lived electrochemical device as described in claim 1, wherein the device comprises a rechargeable battery, the response comprises storing and deriving electrical energy from the battery and the working electrode comprises a metal electrode having a redox potential lower than the redox potential for the conjugated polymer electrode.

22. The method for inducing a response in a long-lived electrochemical device as described in claim 21, wherein said metal electrode comprises lithium.

23. The method for inducing a response in a long-lived electrochemical device as described in claim 21, wherein the conjugated polymer electrode comprises a porous conjugated polymer film having a conducting metal coating on the side thereof facing away from the ionic liquid.

24. The method for inducing a response in a long-lived electrochemical device as described in claim 21, wherein the conjugated polymer electrode comprises a porous conjugated polymer film electrochemically synthesized using the ionic liquid and having a conducting metal coating on the side thereof facing away from the ionic liquid.

25. A long-lived electrochemical device comprising in combination:
   (a) a conjugated polymer working electrode;
   (b) a counter electrode;
   (c) an ionic liquid having an anion and a cation in contact with both said working electrode and said counter electrode; and
   (d) an electronic power supply for applying a voltage between said working electrode and said counter electrode, whereby a response is induced in said electrochemical device.

26. The long-lived electrochemical device as described in claim 25, wherein said ionic liquid is stable in the presence of water and wherein said conjugated polymer is stable in the presence of said ionic liquid.

27. The long-lived electrochemical device as described in claim 25, wherein said ionic liquid is stable for voltages applied between said working electrode and said counter electrode in the range from −3 V to +3 V relative to a standard hydrogen electrode.

28. The long-lived electrochemical device as described in claim 25, wherein said ionic liquid comprises a mixture of ionic liquids.

29. The long-lived electrochemical device as described in claim 25, wherein the ionic liquid comprises at least one ionic solid dissolved in a nonaqueous solvent, where the resulting solution is mixed with another ionic liquid.

30. The long-lived electrochemical device as described in claim 25, wherein the anion comprises a weakly coordinating anion.

31. The long-lived electrochemical device as described in claim 30, wherein the anion is selected from the group consisting of $F^-$; $Br^-$; $I^-$; $NO_3^-$; $N(CN)_2^-$; $RSO_3^-$ where R is an alkyl group, substituted alkyl group, or phenyl group; $(CF_3)_2PF_4^-$, $(CF_3)_3PF_3^-$, $(CF_3)_4PF_2^-$, $(CF_3)_5PF^-$, $(CF_3)_6P^-$, $(CF_2SO_3^-)_2$, $(CF_2CF_2SO_3^-)_2$, $(CF_3SO_2)_2N^-$, $CF_3CF_2(CF_3)_2CO^-$, $(CF_3SO_2)_2CH^-$, $(SF_5)_3C^-$, $(CF_3SO_2)_3C^-$, $[O(CF_3)_2C_2(CF_3)_2O]_2PO^-$, and $CF_3(CF_2)_7SO_3^-$.

32. The long-lived electrochemical device as described in claim 30, wherein the anion comprises a small, weakly coordinating anion.

33. The method for inducing a response in a long-lived electrochemical device as described in claim 32, wherein the anion is selected from the group consisting of $F^-$; $Cl^-$; $I^-$; $Br^-$; $NO_3^-$; $BF_4^-$; $ClO_4^-$; $PF_6^-$; $RSO_3^-$; and $RCOO^-$, where R is an alkyl group, substituted alkyl group, or phenyl group.

34. The long-lived electrochemical device as described in claim 25, wherein the cation is selected from the group consisting of pyridinium ions, pyridazinium ions, pyrimidinium ions, pyrazinium ions, imidazolium ions, pyrazolium ions, thiazolium ions, oxazolium ions, triazolium ions, ammonium ions, pyrrolidinium ions, pyrrolinium ions, pyrrolium ions, and piperidinium ions.

35. The long-lived electrochemical device as described in claim 25, wherein said conjugated polymer is selected from the group consisting of polyphenylene, polyphenylenevinylene, polyphenylenesulfide, polyfluorene, poly(p-pyridine), poly(p-pyridalvinylene), polypyrrole, polyaniline, polythiophene, polythiophenevinylene, polyfuran, polyacetylene, and derivatives thereof.

36. The long-lived electrochemical device as described in claim 25, wherein said conjugated polymer comprises a copolymer selected from the group consisting of phenylene, phenylenevinylene, phenylenesulfide, fluorene, p-pyridine, p-pyridalvinylene, pyrrole, aniline, thiophene, thiophenevinylene, furan, acetylene, and derivatives thereof.

37. The long-lived electrochemical device as described in claim 25, wherein said conjugated polymer comprises an oligomer selected from the group consisting of phenylene, phenylenevinylene, phenylenesulfide, fluorene, p-pyridine, pyridalvinylene, pyrrole, aniline, thiophene, thiophenevinylene, furan, acetylene, and derivatives thereof.

38. The long-lived electrochemical device as described in claim 25, wherein said ionic liquid further comprises an organic cosolvent.

39. The long-lived electrochemical device as described in claim 38, wherein said organic cosolvent is selected from the group consisting of cyclic ethers, esters, carbonates, lactones, nitrites, amides, sulfones, and sulfolanes.

40. The long-lived electrochemical device as described in claim 25, wherein said electrochemical device comprises an actuator, the induced response comprises a change in stress and strain of the actuator and said counter electrode comprises a metal electrode.

41. The long-lived electrochemical device as described in claim 40, wherein said counter electrode comprises a conjugated polymer electrode.

42. The long-lived electrochemical device as described in claim 25, wherein said device comprises a capacitor, said induced response comprises storing an electric charge on said capacitor and said counter electrode comprises a conjugated polymer electrode.

43. The long-lived electrochemical device as described in claim 42, wherein said conjugated polymer electrodes comprise porous conjugated polymer films having a conducting metal coating on the side thereof facing away from said ionic liquid.

44. The long-lived electrochemical device as described in claim 42, wherein said conjugated polymer electrodes comprise porous conjugated polymer films electrochemically synthesized using the ionic liquid and having a conducting metal coating on the side thereof facing away from the ionic liquid.

45. The long-lived electrochemical device as described in claim 25, wherein said device comprises a rechargeable battery, said induced response comprises storing and deriving electrical energy from said battery and said counter electrode comprises a metal electrode having a redox potential lower than the redox potential for conjugated polymer electrode.

46. The long-lived electrochemical device as described in claim 45, wherein said metal electrode comprises lithium.

47. The long-lived electrochemical device as described in claim 45, wherein said conjugated polymer electrode comprises a porous conjugated polymer film having a conducting metal coating on the side thereof facing away from said ionic liquid.

48. The long-lived electrochemical device as described in claim 45, wherein said conjugated polymer electrode comprises a porous conjugated polymer film electrochemically synthesized using the ionic liquid and having a conducting metal coating on the side thereof facing away from the ionic liquid.

* * * * *